United States Patent
Tapley et al.

(10) Patent No.: US 10,586,274 B2
(45) Date of Patent: Mar. 10, 2020

(54) APPLICATIONS FOR WEARABLE DEVICES

(71) Applicant: eBay Inc., San Jose, CA (US)

(72) Inventors: John Tapley, San Jose, CA (US);
Charles Lin, Sunnyvale, CA (US);
Krystal Rose Higgins, Campbell, CA (US)

(73) Assignee: eBay Inc., San Jose, CA (US)

( * ) Notice: Subject to any disclaimer, the term of this patent is extended or adjusted under 35 U.S.C. 154(b) by 0 days.

(21) Appl. No.: 14/459,079

(22) Filed: Aug. 13, 2014

(65) Prior Publication Data

US 2015/0106221 A1  Apr. 16, 2015

Related U.S. Application Data

(60) Provisional application No. 62/013,898, filed on Jun. 18, 2014, provisional application No. 61/936,231, (Continued)

(51) Int. Cl.
*G06Q 30/06* (2012.01)
*G06Q 30/08* (2012.01)

(52) U.S. Cl.
CPC ......... *G06Q 30/0641* (2013.01); *G06Q 30/08* (2013.01)

(58) Field of Classification Search
CPC ........... G06Q 30/0601; G06Q 30/0643; G06Q 30/0641; G06Q 20/32; G06Q 20/322; (Continued)

(56) References Cited

U.S. PATENT DOCUMENTS

| 6,256,028 B1 * | 7/2001 | Sanford ............ G06F 17/30902 707/E17.12 |
| 7,715,873 B1 | 5/2010 | Biere et al. |

(Continued)

FOREIGN PATENT DOCUMENTS

| AU | 2014306671 B2 | 6/2017 | |
| EP | 1041502 A2 * | 3/2000 | ............. G06F 17/60 |

(Continued)

OTHER PUBLICATIONS

Swan, "Sensor Mania! The Internet of Things, Wearable Computing, Objective Metrics, and the Quantified Self 2.0" Journal of Sensor and Actuator Networks, Nov. 8, 2012 (Year: 2012).*

(Continued)

*Primary Examiner* — Kathleen Palavecino
*Assistant Examiner* — Lance Y Cai
(74) *Attorney, Agent, or Firm* — Schwegman Lundberg & Woessner, P.A.

(57) ABSTRACT

Systems and methods of applications for wearable devices are disclosed. In some embodiments, a wearable device receives data from a personal computing device communicatively coupled to the wearable device. The data can correspond to content of an online marketplace. In response to receiving the data, the content can be caused to be displayed on the wearable device. The wearable device can detect an input from a user. The input can correspond to a requested action. The wearable device can transmit at least one instruction to the personal computing device. The instruction(s) can be configured to cause the personal computing device to perform the requested action.

18 Claims, 34 Drawing Sheets

Related U.S. Application Data filed on Feb. 5, 2014, provisional application No. 61/865,464, filed on Aug. 13, 2013.

(58) Field of Classification Search
CPC .... G06Q 30/0633; G06Q 30/00; G06Q 30/08; G06F 3/0482; G06F 3/0605; G06F 11/3006; G06F 11/3034; G06F 16/2455; G06F 16/248; G06F 16/5866; G06F 2201/805; G06F 2201/815; G06F 3/0683; G06F 8/65; G06F 16/172; G06F 3/048; G06F 3/04817

See application file for complete search history.

(56) References Cited

U.S. PATENT DOCUMENTS

| | | | |
|---|---|---|---|
| 7,751,285 B1* | 7/2010 | Cain | G04G 9/0017 368/10 |
| 8,249,547 B1 | 8/2012 | Fellner | |
| 8,289,162 B2* | 10/2012 | Mooring | G06F 3/017 340/407.1 |
| 8,351,773 B2 | 1/2013 | Nasiri et al. | |
| 9,148,398 B2* | 9/2015 | Miller | H04L 51/26 |
| 2002/0065761 A1* | 5/2002 | Fischer et al. | 705/37 |
| 2005/0004984 A1 | 1/2005 | Simpson | |
| 2005/0240512 A1 | 10/2005 | Quintero et al. | |
| 2006/0255963 A1* | 11/2006 | Thompson et al. | 340/825.69 |
| 2008/0268920 A1* | 10/2008 | Billmaier et al. | 455/574 |
| 2011/0213664 A1 | 9/2011 | Osterhout et al. | |
| 2011/0221656 A1 | 9/2011 | Haddick et al. | |
| 2012/0108215 A1 | 5/2012 | Kameli | |
| 2013/0290427 A1* | 10/2013 | Proud | H01F 38/14 709/204 |

FOREIGN PATENT DOCUMENTS

| | | | |
|---|---|---|---|
| EP | 1041502 A2 | 10/2000 | |
| EP | 1041502 A3 | 11/2002 | |
| KR | 1020000071492 A | 7/2001 | |
| KR | 1020100130478 A | 12/2010 | |
| KR | 1020120085054 A | 7/2012 | |
| KR | 1020130000401 A1 | 1/2013 | |
| WO | WO-2015023774 A1 | 2/2015 | |

OTHER PUBLICATIONS

"International Application Serial No. PCT/US2014/050929, International Search Report dated Dec. 12, 2014", 2 pgs.
"International Application Serial No. PCT/US2014/050929, Written Opinion dated Dec. 12, 2014", 6 pgs.
"International Application Serial No. PCT/US2014/050929, International Preliminary Report on Patentability dated Feb. 25, 2016", 8 pgs.
"Australian Application Serial No. 2014306671, First Examiner Report dated Jul. 15, 2016", 3 pgs.
"Korean Application Serial No. 2016-7006558, Office Action dated Oct. 6, 2016", (With English Translation), 12 pgs.
"Australian Application Serial No. 2014306671, Response filed Jan. 23, 2017 to First Examiner Report dated Jul. 15, 2016", 19 pgs.
"Australian Application Serial No. 2014306671, Subsequent Examiners Report dated Feb. 7, 2017", 3 pgs.
"Canadian Application Serial No. 2,921,374, Office Action dated Dec. 9, 2016", 7 pgs.
"Korean Application Serial No. 2016-7006558, Response filed Jan. 6, 2017 to Office Action dated Oct. 6, 2016", (English Translation of Claims), 23 pgs.
"SmartWatch Notifier for eBay", Unexpected Development, [Online] retrieved from the internet: <https://play.google.com/store/apps/details?id=com.sonyericsson.extras.liveware.extension.ebaysmartwatchnotifier&hl=en>, (Jul. 18, 2012), 4 pgs.
"Australian Application Serial No. 2014306671, Response filed May 16, 2017 to Subsequent Examiners Report dated Feb. 7, 2017", 3 pgs.
"Korean Application Serial No. 2016-7006558, Office Action dated May 24, 2017", w/English Translation, 6 pgs.
Response to Office Action filed on Dec. 26, 2017 for Korean Patent Application No. 10-2016-7006558, dated Sep. 25, 2017, 23 pages (18 pages of Official Copy and 5 pages of English Claims).
Office Action received for Korean Patent Application No. 10-2016-7006558, dated Sep. 25, 2017, 10 pages.
Response to Office Action filed on Aug. 23, 2017 for Korean Patent Application No. 10-2016-7006558, dated May 24, 2017, 24 pages (19 pages of Official Copy and 5 pages of English Claims).
Response to Office Action filed on Jun. 5, 2017 for Canadian Patent Application No. 2,921,374, dated Dec. 9, 2016, 21 pages.
Office Action received for Canadian Patent Application No. 2,921,374, dated Nov. 7, 2017, 8 pages.
Response to Office Action filed on May 7, 2018, for Canada Patent Application No. 2,921,374, dated Nov. 7, 2017, 14 pages.
Office Action received for Canadian Patent Application No. 2,921,374, dated Nov. 6, 2018, 10 pages.
"Canadian Application Serial No. 2,921,374, Response filed May 6, 2019 to Office Action dated Nov. 6, 2018", 12 pages.
Office Action received for Korean Patent Application No. 10-2016-7006558, dated Aug. 12, 2019, 9 pages (5 pages of Official copy and 4 pages of English Translation).
Response to Office Action filed on Oct. 14, 2019, for Korean Patent Application No. 10-2016-7006558, dated Aug. 12, 2019, 16 pages (11 pages of Official copy & 5 pages of Claims).
Amendment filed for Korean Patent Application No. 10-2017-7037286 dated Aug. 13, 2019, 11 pages (6 pages official copy and 5 pages English translation).
Office Action received for Canadian Patent Application No. 2,921,374, dated Sep. 24, 2019, 11 pages.
Office Action received for Korean Patent Application No. 10-2017-7037286, dated Oct. 22, 2019, 6 pages (3 pages of Official copy and 3 pages of English Translation).
Response to Office Action filed on Dec. 17, 2019, for Korean Patent Application No. 10-2017-7037286, dated Oct. 22, 2019, 13 pages (10 pages of Official Copy & 3 pages of English Pending Claims).

\* cited by examiner

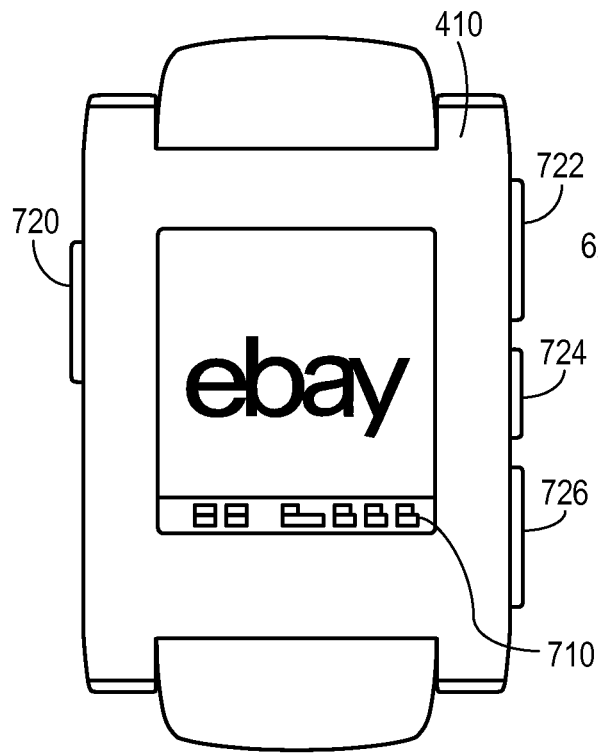 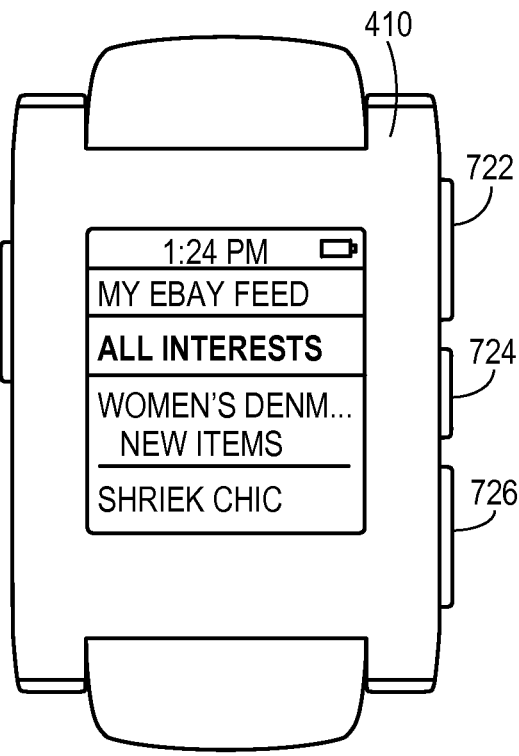
FIG. 7A  FIG. 7B
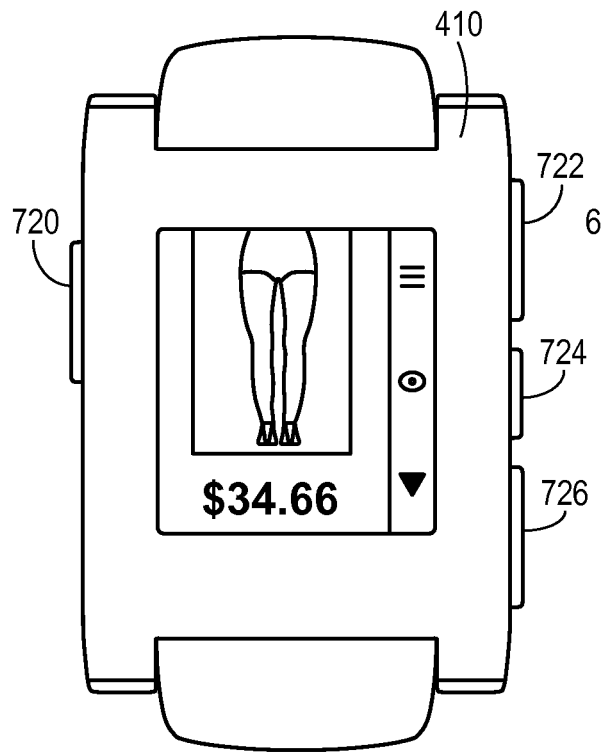 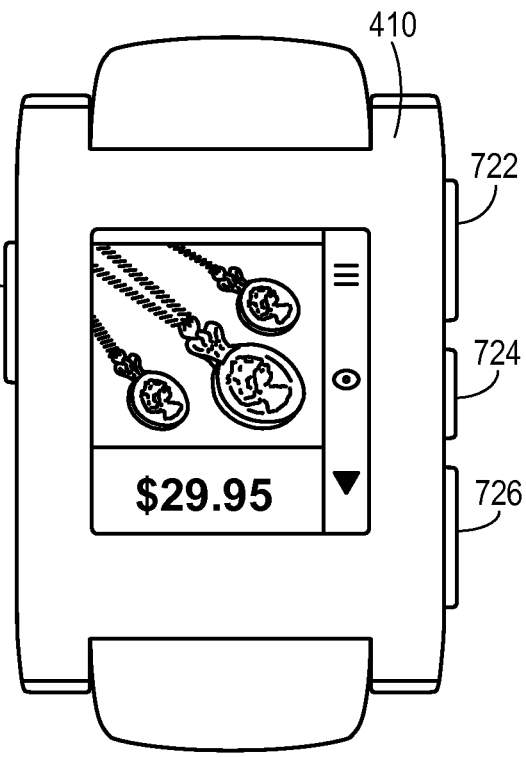
FIG. 7C  FIG. 7D

APPLICATIONS FOR WEARABLE DEVICES

CROSS-REFERENCE TO RELATED APPLICATIONS

This application claims priority to U.S. Provisional Application No. 61/865,464, filed on Aug. 13, 2013, entitled, "APPLICATIONS FOR WEARABLE DEVICES," to U.S. Provisional Application No. 61/936,231, filed on Feb. 5, 2014, entitled, "ONLINE CONTENT FEED ON A WEARABLE DEVICE," and to U.S. Provisional Application No. 62/013,898, filed on Jun. 18, 2014, entitled, "APPLICATIONS FOR WEARABLE DEVICES," all of which are hereby incorporated by reference in their entirety as if set forth herein.

TECHNICAL FIELD

The present application relates generally to the technical field of data processing, and, in various embodiments, to systems and methods of applications for wearable devices.

BACKGROUND

Wearable devices can be limited in terms of screen size and processing power, as well as a lack of other capabilities. As a result, ability to perform certain functions on such devices can be hindered.

BRIEF DESCRIPTION OF THE DRAWINGS

Some embodiments of the present disclosure are illustrated by way of example and not limitation in the figures of the accompanying drawings, in which like reference numbers indicate similar elements, and in which:

FIGS. 7A-7L illustrate different stages of an application for a wearable device, in accordance with some embodiments;

DETAILED DESCRIPTION

Figure 1:
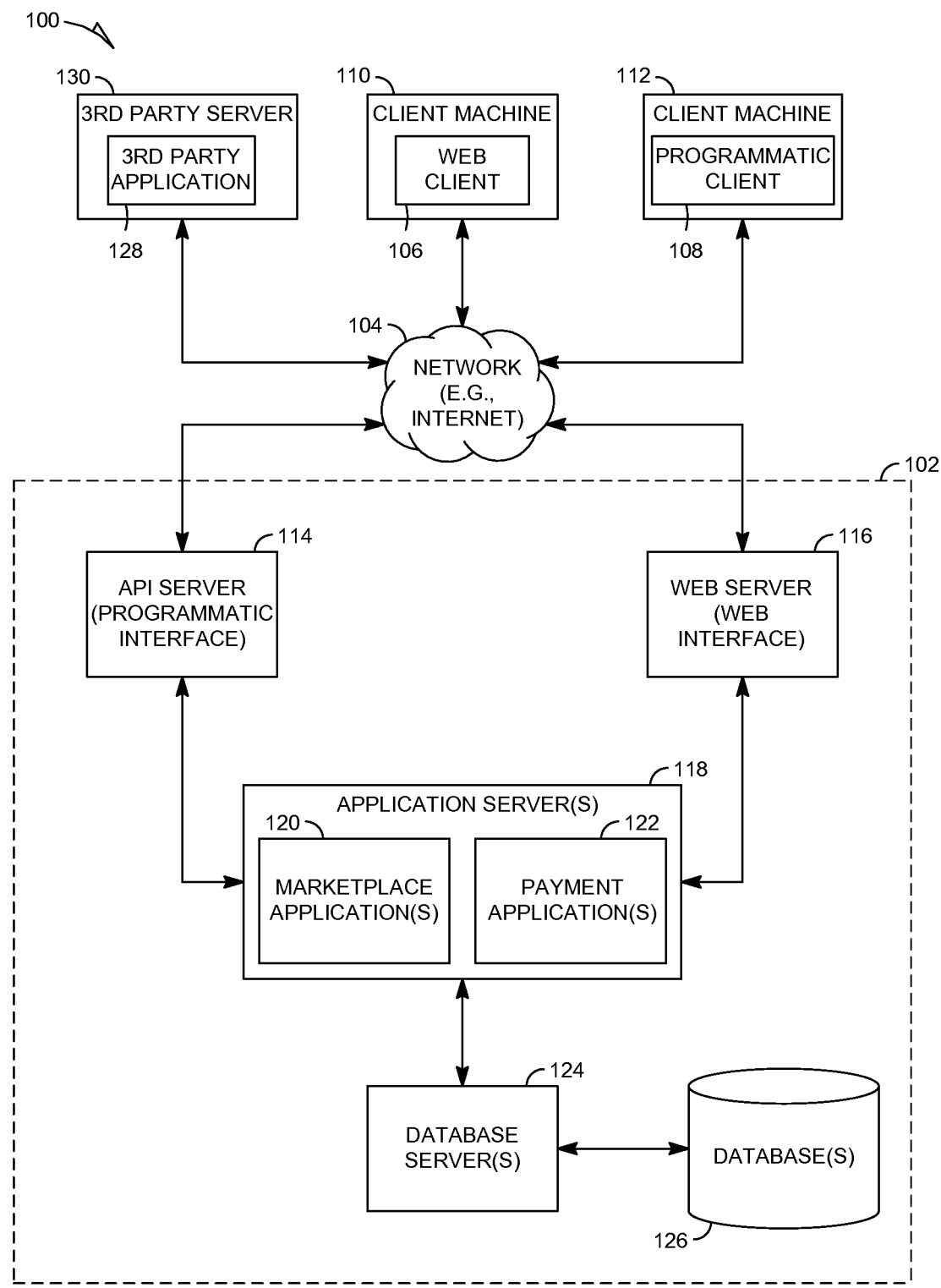
FIG. 1 is a block diagram depicting a network architecture of a system having a client-server architecture configured for exchanging data over a network, in accordance with some embodiments.

The description that follows includes illustrative systems, methods, techniques, instruction sequences, and computing machine program products that embody illustrative embodiments. In the following description, for purposes of explanation, numerous specific details are set forth in order to provide an understanding of various embodiments of the inventive subject matter. It will be evident, however, to those skilled in the art that embodiments of the inventive subject matter can be practiced without these specific details. In general, well-known instruction instances, protocols, structures, and techniques have not been shown in detail.

In some embodiments, features of the present disclosure overcome deficiencies of wearable devices by enabling a wearable device to provide one or more instructions to a personal computing device (e.g., a smartphone) of a user of the wearable device to perform one or more actions requested by the user via one or more inputs provided by the user to the wearable device. In this respect, the user can benefit from the convenience of the wearable device, while leveraging additional capabilities of the personal computing device.

In some embodiments, a wearable device receives data from the personal computing device. The data can correspond to, for example, content of an online marketplace. In response to receiving the data, the content can be caused to be displayed on the wearable device. The wearable device can then detect an input from a user. The input can correspond to a requested action. The requested action can be based on the content. The wearable device can then transmit at least one instruction to the personal computing device. The instruction(s) can be configured to cause the personal computing device to perform the requested action.

In some embodiments, any of the data or instructions discussed herein can be transmitted between a marketplace server and the wearable device directly without the use of the personal computing device. For example, the data corresponding to the content can be transmitted from the marketplace server to the wearable device without the data being transmitted to the personal computing device. Additionally, the instruction(s) to perform the requested action(s) can be transmitted from the wearable device to the marketplace server without the instruction(s) being transmitted to the personal computing device.

In some embodiments, the wearable device comprises a smartwatch. In some embodiments, the personal computing device comprises a smartphone.

In some embodiments, causing the content to be displayed on the wearable device comprises causing a notification to be displayed on the wearable device. In some embodiments, the notification is configured to notify the user of an item being offered for sale on the online marketplace. In other embodiments, the notification is configured to notify the user that the user has been outbid on an item being offered for sale on the online marketplace.

In some embodiments, the instruction(s) is/are configured to cause the personal computing device to display an item listing page for an item being offered for sale on the online marketplace. In other embodiments, the instruction(s) is/are configured to cause the personal computing device to instruct the online marketplace to place a bid, on behalf of the user, for an item being offered for sale on the online marketplace. In further embodiments, the instruction(s) is/are configured to cause the personal computing device to instruct the online marketplace to increase a bid, on behalf of the user, for an item being offered for sale on the online marketplace.

In some embodiments, causing the content to be displayed on the wearable device comprises causing to be displayed on the wearable device information of a first item being offered for sale on the online marketplace, detecting an indication of the user shaking the wearable device, and, in response to detecting the indication of the user shaking the wearable device, causing to be displayed on the wearable device information of a second item being offered for sale on the online marketplace.

In some embodiments, a remaining time notification is caused to be displayed on a home screen of an operating system on the wearable device. The remaining time notification can be configured to indicate an amount of time remaining for an item being offered for sale on the online marketplace.

The methods or embodiments disclosed herein can be implemented as a computer system having one or more modules (e.g., hardware modules or software modules). Such modules can be executed by one or more processors of the computer system. The methods or embodiments disclosed herein can be embodied as instructions stored on a machine-readable medium that, when executed by one or more processors, cause the one or more processors to perform the instructions.

FIG. 1 is a network diagram depicting a client-server system 100, within which one example embodiment can be deployed. A networked system 102, in the example forms of a network-based marketplace or publication system, provides server-side functionality, via a network 104 (e.g., the Internet or a Wide Area Network (WAN)) to one or more clients. FIG. 1 illustrates, for example, a web client 106 (e.g., a browser, such as the Internet Explorer browser developed by Microsoft Corporation of Redmond, Wash. State) and a programmatic client 108 executing on respective client machines 110 and 112. Client machines 110 and 112 can comprise wearable devices (e.g., smartwatches) and other personal computing devices (e.g., smartphones), as will be discussed in further detail below.

An API server 114 and a web server 116 are coupled to, and provide programmatic and web interfaces respectively to, one or more application servers 118. The application servers 118 host one or more marketplace applications 120 and payment applications 122. The application servers 118 are, in turn, shown to be coupled to one or more database servers 124 that facilitate access to one or more databases 126.

The marketplace applications 120 can provide a number of marketplace functions and services to users who access the networked system 102. The payment applications 122 can likewise provide a number of payment services and functions to users. The payment applications 122 can allow users to accumulate value (e.g., in a commercial currency, such as the U.S. dollar, or a proprietary currency, such as "points") in accounts, and then later to redeem the accumulated value for products (e.g., goods or services) that are made available via the marketplace applications 120. While the marketplace and payment applications 120 and 122 are shown in FIG. 1 to both form part of the networked system 102, it will be appreciated that, in alternative embodiments, the payment applications 122 can form part of a payment service that is separate and distinct from the networked system 102.

Further, while the client-server system 100 shown in FIG. 1 employs a client-server architecture, the embodiments are, of course not limited to such an architecture, and can equally well find application in a distributed, or peer-to-peer, architecture system, for example. The various marketplace and payment applications 120 and 122 could also be implemented as standalone software programs, which do not necessarily have networking capabilities.

The web client 106 accesses the various marketplace and payment applications 120 and 122 via the web interface supported by the web server 116. Similarly, the programmatic client 108 accesses the various services and functions provided by the marketplace and payment applications 120 and 122 via the programmatic interface provided by the API server 114. The programmatic client 108 can, for example, be a seller application (e.g., the TurboLister application developed by eBay Inc., of San Jose, Calif.) to enable sellers to author and manage listings on the networked system 102 in an off-line manner, and to perform batch-mode communications between the programmatic client 108 and the networked system 102.

FIG. 1 also illustrates a third party application 128, executing on a third party server machine 130, as having programmatic access to the networked system 102 via the programmatic interface provided by the API server 114. For example, the third party application 128 can, utilizing information retrieved from the networked system 102, support one or more features or functions on a website hosted by the third party. The third party website can, for example, provide one or more promotional, marketplace, or payment functions that are supported by the relevant applications of the networked system 102.

Figure 2:
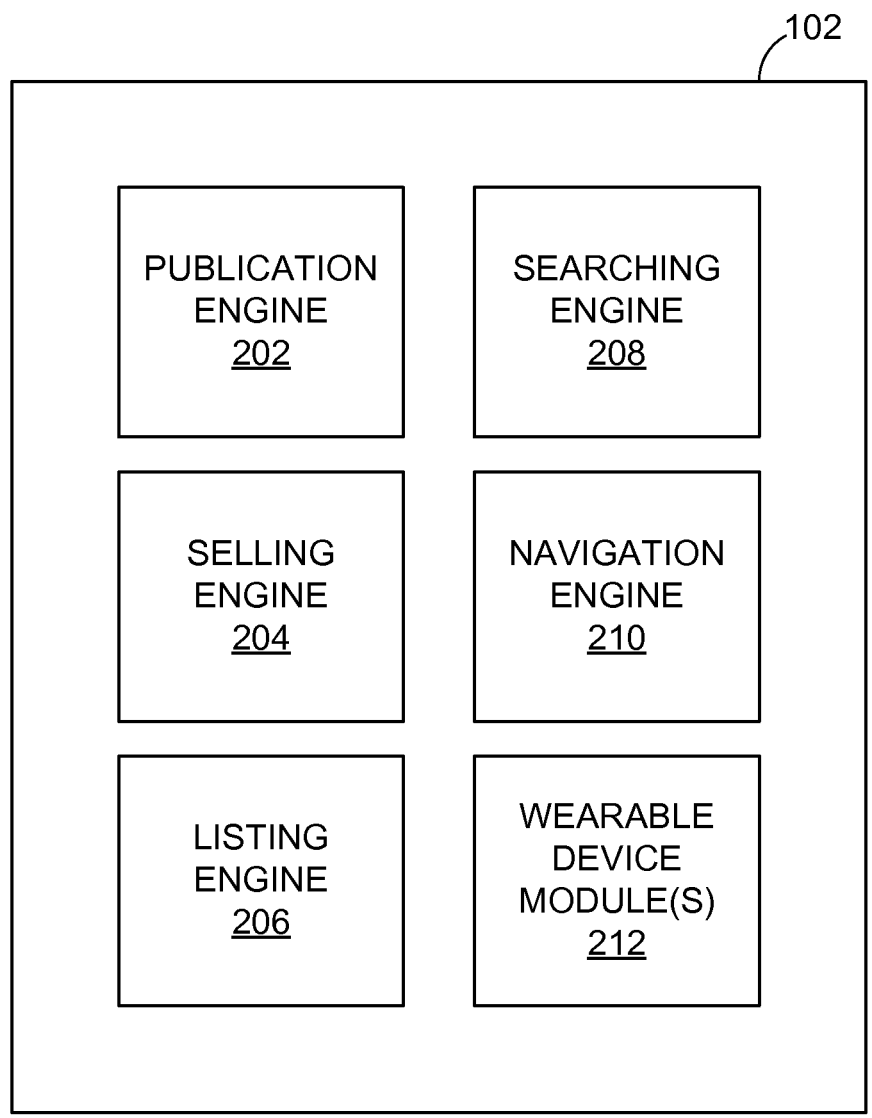
FIG. 2 is a block diagram depicting various components of a network-based publication system, in accordance with some embodiments.

FIG. 2 illustrates a block diagram showing components provided within the networked system 102 according to some embodiments. The networked system 102 can be hosted on dedicated or shared server machines (not shown) that are communicatively coupled to enable communications between the server machines. The components themselves are communicatively coupled (e.g., via appropriate interfaces) to each other and to various data sources, so as to allow information to be passed between the applications or so as to allow the applications to share and access common data. Furthermore, the components can access one or more databases 126 via the database servers 124.

The networked system 102 can provide a number of publishing, listing, and/or price-setting mechanisms whereby a seller (also referred to as a "first user") can list (or publish information concerning) goods or services for sale or barter, a buyer (also referred to as a "second user") can express interest in or indicate a desire to purchase or barter such goods or services, and a transaction (such as a trade) can be completed pertaining to the goods or services. To this end, the networked system 102 can comprise at least one publication engine 202 and one or more selling engines 204. The publication engine 202 can publish information, such as item listings or product description pages, on the networked system 102. In some embodiments, the selling engines 204 can comprise one or more fixed-price engines that support fixed-price listing and price setting mechanisms, and one or more auction engines that support auction-format listing and price setting mechanisms (e.g., English, Dutch, Chinese, Double, Reverse auctions). The various auction engines can also provide a number of features in support of these auction-format listings, such as a reserve price feature whereby a seller can specify a reserve price in connection with a listing, and a proxy-bidding feature whereby a bidder can invoke automated proxy bidding. The selling engines 204 can further comprise one or more deal engines that support merchant-generated offers for products and services.

A listing engine 206 allows sellers to conveniently author listings of items or authors to author publications. In one embodiment, the listings pertain to goods or services that a user (e.g., a seller) wishes to transact via the networked system 102. In some embodiments, the listings can be an offer, deal, coupon, or discount for the good or service. Each good or service is associated with a particular category. The listing engine 206 can receive listing data such as title, description, and aspect name/value pairs. Furthermore, each listing for a good or service can be assigned an item identifier. In other embodiments, a user can create a listing that is an advertisement or other form of information publication. The listing information can then be stored to one or more storage devices coupled to the networked system 102 (e.g., databases 126). Listings also can comprise product description pages that display a product and information (e.g., product title, specifications, and reviews) associated with the product. In some embodiments, the product description page can include an aggregation of item listings that correspond to the product described on the product description page.

The listing engine 206 can also allow buyers to conveniently author listings or requests for items desired to be purchased. In some embodiments, the listings can pertain to goods or services that a user (e.g., a buyer) wishes to transact via the networked system 102. Each good or service is associated with a particular category. The listing engine 206 can receive as much or as little listing data, such as title, description, and aspect name/value pairs, that the buyer is aware of about the requested item. In some embodiments, the listing engine 206 can parse the buyer's submitted item information and can complete incomplete portions of the listing. For example, if the buyer provides a brief description of a requested item, the listing engine 206 can parse the description, extract key terms and use those terms to make a determination of the identity of the item. Using the determined item identity, the listing engine 206 can retrieve additional item details for inclusion in the buyer item request. In some embodiments, the listing engine 206 can assign an item identifier to each listing for a good or service.

In some embodiments, the listing engine 206 allows sellers to generate offers for discounts on products or services. The listing engine 206 can receive listing data, such as the product or service being offered, a price and/or discount for the product or service, a time period for which the offer is valid, and so forth. In some embodiments, the listing engine 206 permits sellers to generate offers from the sellers' mobile devices. The generated offers can be uploaded to the networked system 102 for storage and tracking.

Searching the networked system 102 is facilitated by a searching engine 208. For example, the searching engine 208 enables keyword queries of listings published via the networked system 102. In example embodiments, the searching engine 208 receives the keyword queries from a device of a user and conducts a review of the storage device storing the listing information. The review will enable compilation of a result set of listings that can be sorted and returned to the client device (e.g., client machine 110, 112) of the user. The searching engine 208 can record the query (e.g., keywords) and any subsequent user actions and behaviors (e.g., navigations).

The searching engine 208 also can perform a search based on the location of the user. A user can access the searching engine 208 via a mobile device and generate a search query. Using the search query and the user's location, the searching engine 208 can return relevant search results for products, services, offers, auctions, and so forth to the user. The searching engine 208 can identify relevant search results both in a list form and graphically on a map. Selection of a graphical indicator on the map can provide additional details regarding the selected search result. In some embodiments, the user can specify as part of the search query a radius or distance from the user's current location to limit search results.

The searching engine 208 also can perform a search based on an image. The image can be taken from a camera or imaging component of a client device or can be accessed from storage.

In a further example, a navigation engine 210 allows users to navigate through various categories, catalogs, or inventory data structures according to which listings can be classified within the networked system 102. For example, the navigation engine 210 allows a user to successively navigate down a category tree comprising a hierarchy of categories (e.g., the category tree structure) until a particular set of listings is reached. Various other navigation applications within the navigation engine 210 can be provided to supplement the searching and browsing applications. The navigation engine 210 can record the various user actions (e.g., clicks) performed by the user in order to navigate down the category tree.

In some embodiments, one or more wearable device modules 212 can be configured to provide features for wearable devices. Although the wearable device module(s) 212 are shown in FIG. 2 as being incorporated into the networked system 102, it is contemplated that the wearable device module(s) 212 can additionally, or alternatively, be incorporated into a personal computing device or a wearable device of a user. The features, functions, and operations of the wearable device module(s) 212 will be discussed in further detail below with respect to FIGS. 4-18.

Additional modules and engines associated with the networked system 102 are described below in further detail. It should be appreciated that modules or engines can embody various aspects of the details described below.

Figure 3:
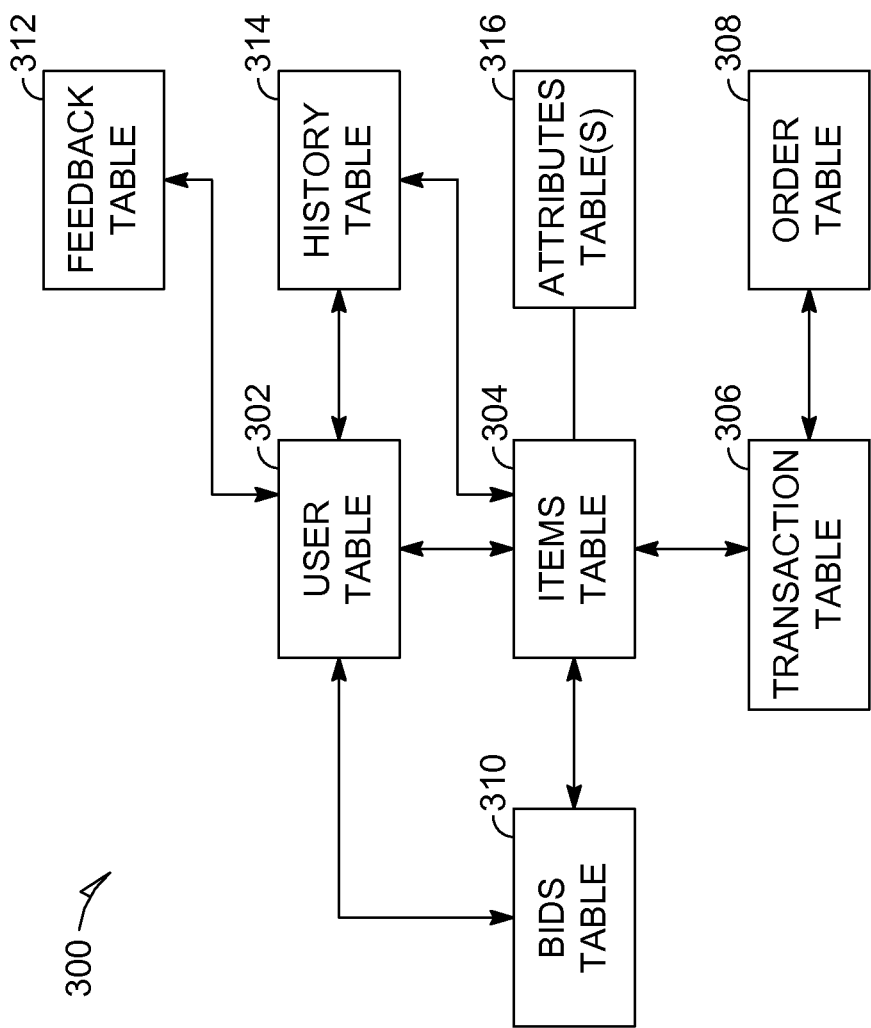
FIG. 3 is a block diagram depicting various tables that can be maintained within a database, in accordance with some embodiments.

FIG. 3 is a high-level entity-relationship diagram, illustrating various tables 300 that can be maintained within the database(s) 126, and that are utilized by and support the applications 120 and 122. A user table 302 contains a record for each registered user of the networked system 102, and can include identifier, address and financial instrument information pertaining to each such registered user. A user can operate as a seller, a buyer, or both, within the networked system 102. In one example embodiment, a buyer can be a user that has accumulated value (e.g., commercial or proprietary currency), and is accordingly able to exchange the accumulated value for items that are offered for sale by the networked system 102.

The tables 300 also include an items table 304 in which are maintained item records for goods and services that are available to be, or have been, transacted via the networked system 102. Each item record within the items table 304 can further be linked to one or more user records within the user table 302, so as to associate a seller and one or more actual or potential buyers with each item record.

A transaction table 306 contains a record for each transaction (e.g., a purchase or sale transaction) pertaining to items for which records exist within the items table 304.

An order table 308 is populated with order records, with each order record being associated with an order. Each order, in turn, can be associated with one or more transactions for which records exist within the transaction table 306.

Bid records within a bids table 310 each relate to a bid received at the networked system 102 in connection with an auction-format listing supported by an auction application. A feedback table 312 is utilized by one or more reputation applications, in one example embodiment, to construct and maintain reputation information concerning users. A history table 314 maintains a history of transactions to which a user has been a party. One or more attributes tables 316 record attribute information pertaining to items for which records exist within the items table 304. Considering only a single example of such an attribute, the attributes tables 316 can indicate a currency attribute associated with a particular item, with the currency attribute identifying the currency of a price for the relevant item as specified by a seller.

In some embodiments, the tables 300 can comprise data structures that can be loaded into memory or reside in memory. The memory can be updated or changed as the tables change.

Applications for Wearable Devices

Wearable devices can provide a size-limited display screen on which graphical user interfaces (GUIs) may be displayed. Examples of wearable devices can include, but are not limited to, smartwatches, bracelets, cuffs, rings, glasses, pendants, brooches, headbands and hair accessories, pocket chains, anklets, and the like. Other types of wearable devices are also within the scope of the present disclosure. The wearable devices may be equipped with input means such as touchscreens, buttons or keys, accelerometers, a gyroscope, an image capture device, a microphone, or the like. The wearable devices may include a processor, memory, and network communications devices (e.g., wi-fi, Bluetooth, mobile data).

Due to the limited size of a display screen and limited means for providing inputs, the wearable device may be used by a user in conjunction with another personal computing device, such as a mobile device (e.g., a smartphone), a tablet computer, a netbook, a laptop computer, a set-top box for a television, or a gaming console. Other personal computing devices are also within the scope of the present disclosure. Certain tasks may be performed by the user using the personal computing device. These tasks may be more input-intensive or require a larger display. Some of these tasks include setting up accounts, submitting and saving searches, setting up alerts, accessing original or longer versions of digital content, setting a maximum bid in an auction, setting a desired bid increment in an online auction, or the like.

After these tasks have been performed using the personal computing device, follow-up or subsequent updates or action items may be performed using the wearable device. For example, these action items may include receiving scheduled alerts, individual turn-by-turn directions provided by geographical mapping and navigation directions, bidding on online auctions, surfacing updated search results, finalizing payment in an online transaction, receiving confirmation of the payment, or displaying action items based on a time of day or a geographical location. The user, using input means of the wearable device, may manage active alerts (e.g., dismiss or snooze), mark an action item complete and move on to a next action items (e.g., while navigating, making a particular turn may trigger direction to make a next turn), and confirm a bid, a payment, or a purchase.

In particular embodiments relating to online auctions, the user may use a personal computing device to identify auctions that the user is interested in bidding in, auctions where the user is watching the item, or auctions where the user has already bid. The user may set one or more notifications to send to the wearable device, such as when the user is outbid, when an auction for a watched item ends, or when an auction that the user has bid in is ending. The user may define one or more inputs (e.g., gestures) that cause an action if a notification is active. The actions may be to set a value of a bid, submit a bid, find a similar item if outbid, or the like.

The wearable device and the personal computing device can then initiate an electronic communication between one another. The devices may communicate electronically using, for example, Bluetooth or WiFi. The personal computing device may communicate the notification to the wearable device. The wearable device can then display or otherwise output the communication to the user. The user may dismiss the notification or perform one of a set of pre-defined actions in response to the notification. The response to the notification can be communicated to the personal computing device. The personal computing device, in turn, can communicate with, for example, an online marketplace (e.g., via a network 104, such as the Internet or a WAN) to act on the user's behalf by, for example, placing a bid in an online auction.

Figure 4:
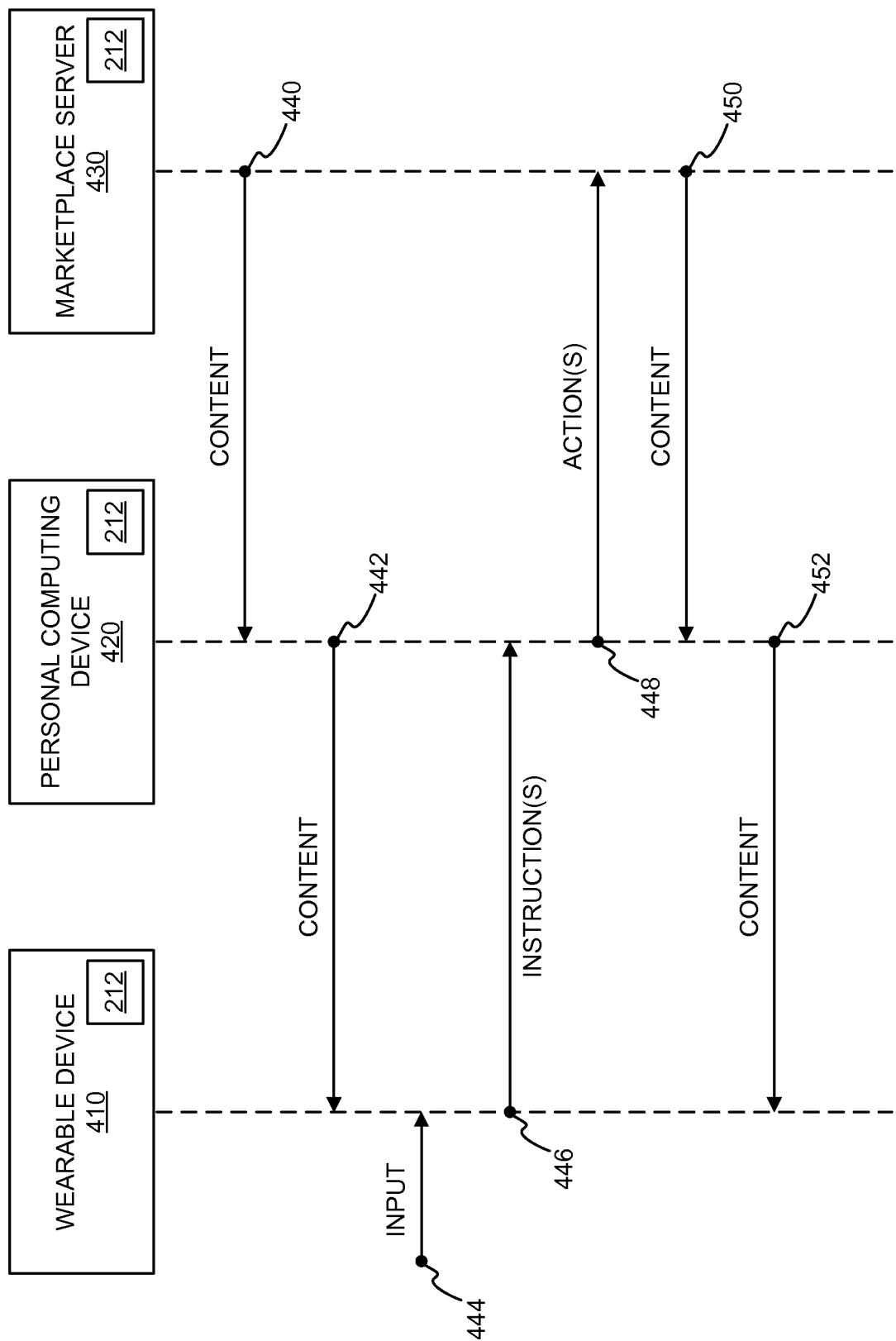
FIG. 4 is a process flow diagram, in accordance with some embodiments.

FIG. 4 is a process flow diagram, in accordance with some embodiments. A wearable device 410 of a user, a personal computing device 420 of the user, and a marketplace server 430 can communicate with one another in order to perform the features disclosed herein. The marketplace server 430 can be an online marketplace server or an offline marketplace server. The marketplace server 430 can be incorporated into the application server(s) 118 in FIG. 1. The wearable device 410 can include, but is not limited to, a smartwatch, a bracelet, a cuff, a ring, glasses, a pendant, a brooch, a headband, a hair accessory, a pocket chain, or an anklet. Other types of wearable devices 410 are also within the scope of the present disclosure. The personal computing device 420 can comprise a smartphone, a tablet computer, a netbook, a laptop computer, a set-top box for a television, or a gaming console. Other types of personal computing devices 420 are also within the scope of the present disclosure.

The wearable device module(s) 212, previously mentioned with respect to FIG. 2 can be incorporated into any combination of one or more of the wearable device 410, the personal computing device 420, and the marketplace server 430. The implementation of the features disclosed herein can be achieved using different or overlapping aspects of the wearable device module(s) 212 on the wearable device 410, the personal computing device 420, and the marketplace server 430. Accordingly, as will be discussed in further detail below, functions of the wearable device module(s) 212 can be performed on the wearable device 410, on the personal computing device 420, and on the marketplace server 430.

At point 440 in the process flow diagram, the marketplace server 430 can transmit data corresponding to content of the marketplace server 430 to the personal computing device 420. In some embodiments, the content comprises a notification about an item being offered for sale on the marketplace server 430. In other embodiments, the notification comprises a notification that the user has been outbid on an item being offered for sale on the marketplace server 430.

At point 442 in the process flow diagram, the personal computing device 420 can transmit the data corresponding to the content to the wearable device 410. The wearable device 410 can then display, or otherwise present, the content to the user based on the received data.

At point 444 in the process flow diagram, the wearable device 410 can detect an input from the user. The input can include a selection of a graphical user interface element. Other types of inputs are also within the scope of the present disclosure. The input can correspond to one or more requested actions. For example, the user can select an option to place a bid or increase a bid on an item being offered for sale on the marketplace server 430.

At point 446 in the process flow diagram, the wearable device 410 can transmit one or more instructions to the personal computing device 420. The instruction(s) can be configured to cause the personal computing device 420 to perform the requested action(s).

At point 448 in the process flow diagram, the personal computing device 420 can perform the requested action(s). For example, the personal computing device 420 can transmit a request, on behalf of the user, to the marketplace server 430 to place a bid or increase a bid on an item being offered for sale on the marketplace server 430 on behalf of the user.

At point 450 in the process flow diagram, the marketplace server 430 can perform the requested action(s) or another action corresponding to the requested action(s), and then send data corresponding to additional content to the personal computing device 420. This additional content can comprise a notification confirming the completion of the requested action(s) or follow-up prompting for more input. Other types of additional content are also within the scope of the present disclosure.

At point 452 in the process flow diagram, the personal computing device 420 can transmit the data corresponding to the additional content to the wearable device 410, where the additional content can then be displayed to the user.

All of the operations discussed above can be repeated as many times as appropriate to fulfill any particular scenario. In some embodiments, any of the data or instructions discussed above can be transmitted between the marketplace server 430 and the wearable device 410 directly without the use of the personal computing device 420. For example, the data corresponding to the content can be transmitted from the marketplace server 430 to the wearable device 410 without the data being transmitted to the personal computing device 420. Additionally, the instruction(s) to perform the requested action(s) can be transmitted from the wearable device 410 to the marketplace server 430 without the instruction(s) being transmitted to the personal computing device 420.

Furthermore, it is contemplated that any number of wearable devices 410, personal computing devices 420, and marketplace servers 430 can be employed. For example, the user can have multiple wearable devices 410 receiving data from one or more personal computing devices 420 or from one or more marketplace servers 430. Additionally, a single wearable device 410 can receive data from and provide instructions to multiple personal computing devices 420 or multiple marketplace servers 430.

While several of the examples disclosed herein include use cases involving an auction, it is contemplated that the features of the present disclosure can also be applied to other use cases as well, including fixed price items. For example, notifications of fixed price items can be provided to the wearable device 410, and the user can use the wearable device 410 to request to purchase fixed price items. Furthermore, although the examples disclosed herein include use cases involving commerce (e.g., e-commerce), it is contemplated that the features of the present disclosure can also be applied to non-commerce-related use cases as well. In this respect, the features of the present disclosure can be used to provide any type of notifications on a wearable device, as well as to enable a user to request certain actions via the wearable device.

Figure 5A:
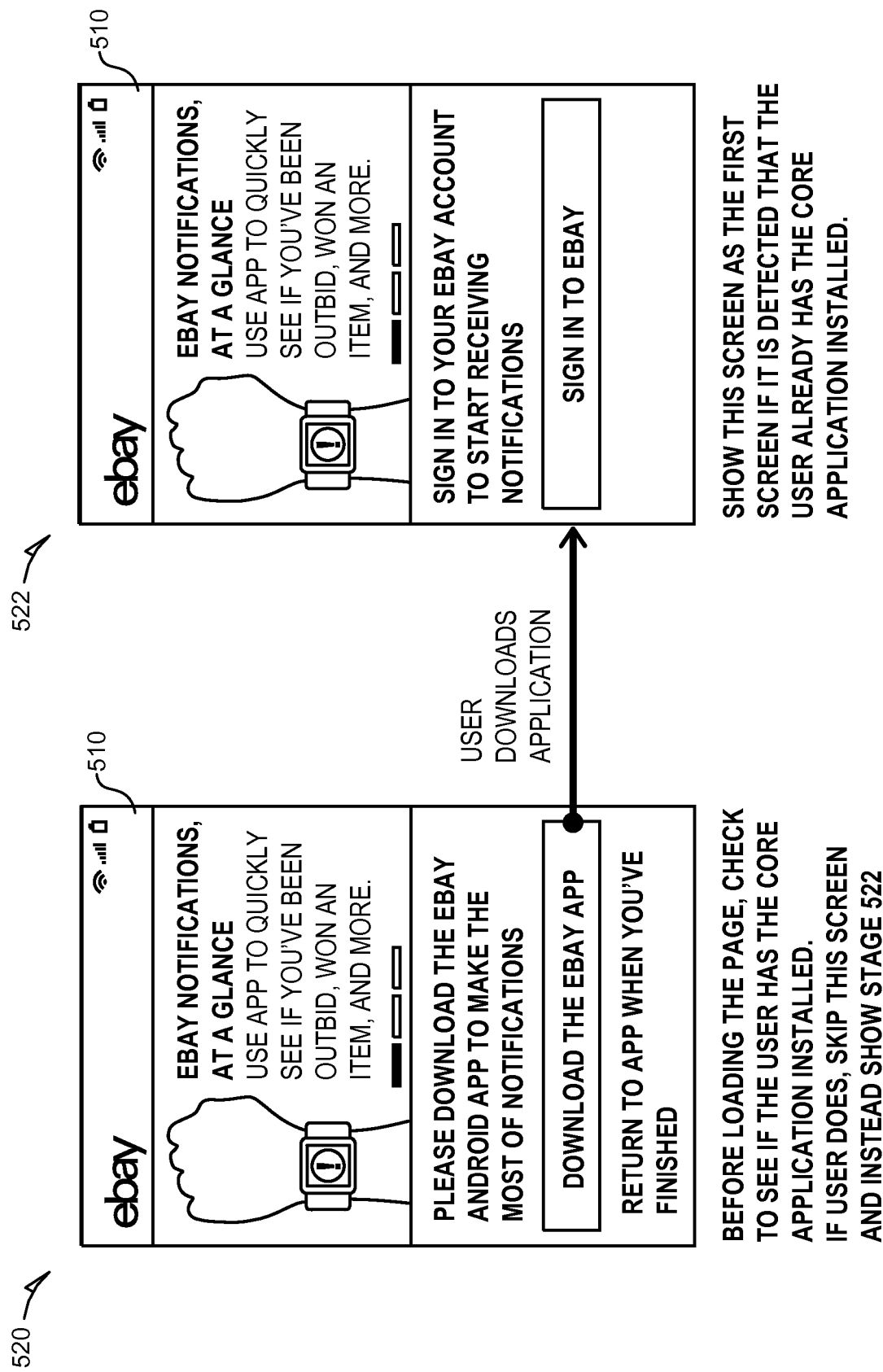
FIGS. 5A-5D illustrate different stages of an application for a wearable device, in accordance with some embodiments.
Figure 5B:
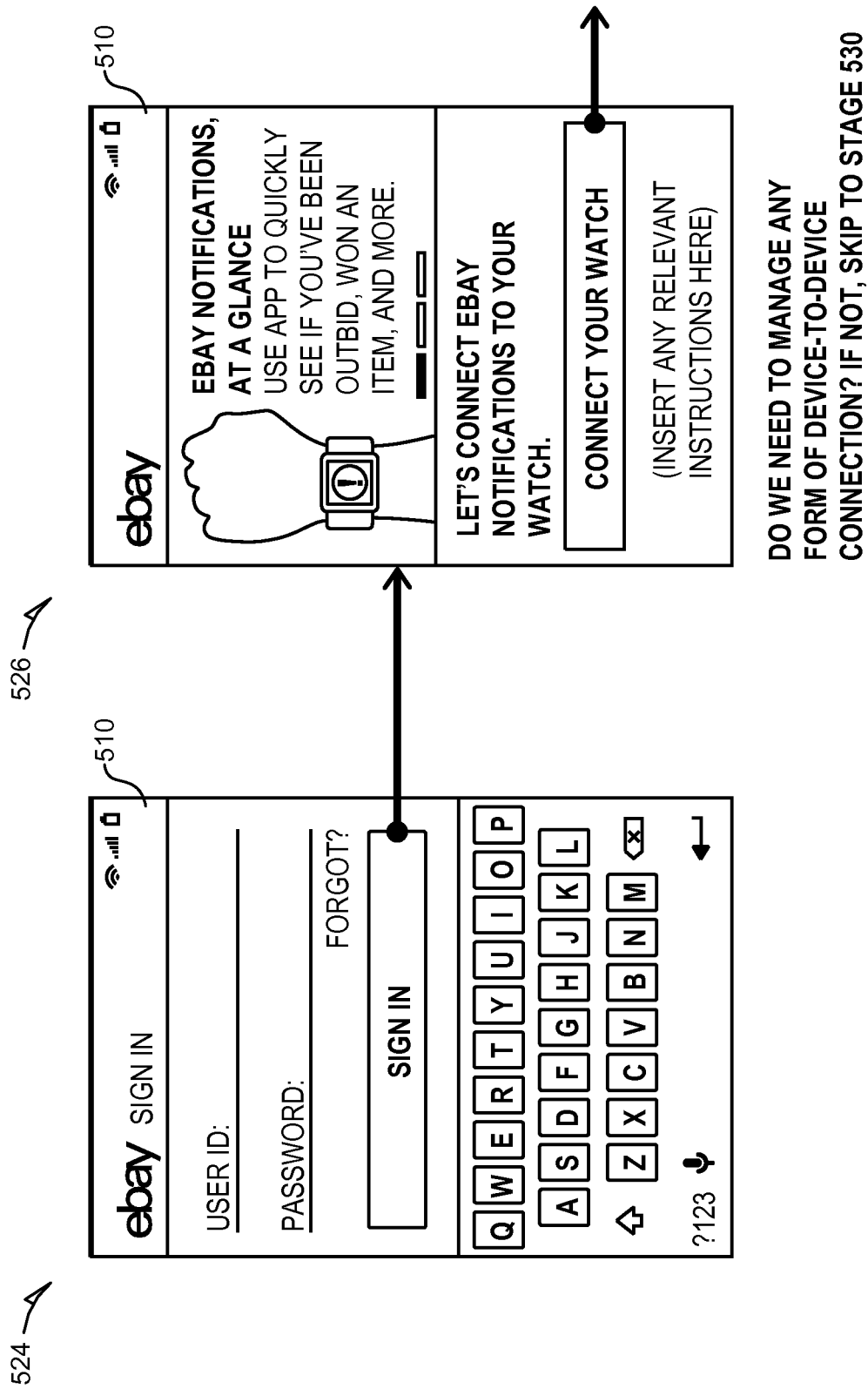
Figure 5C:
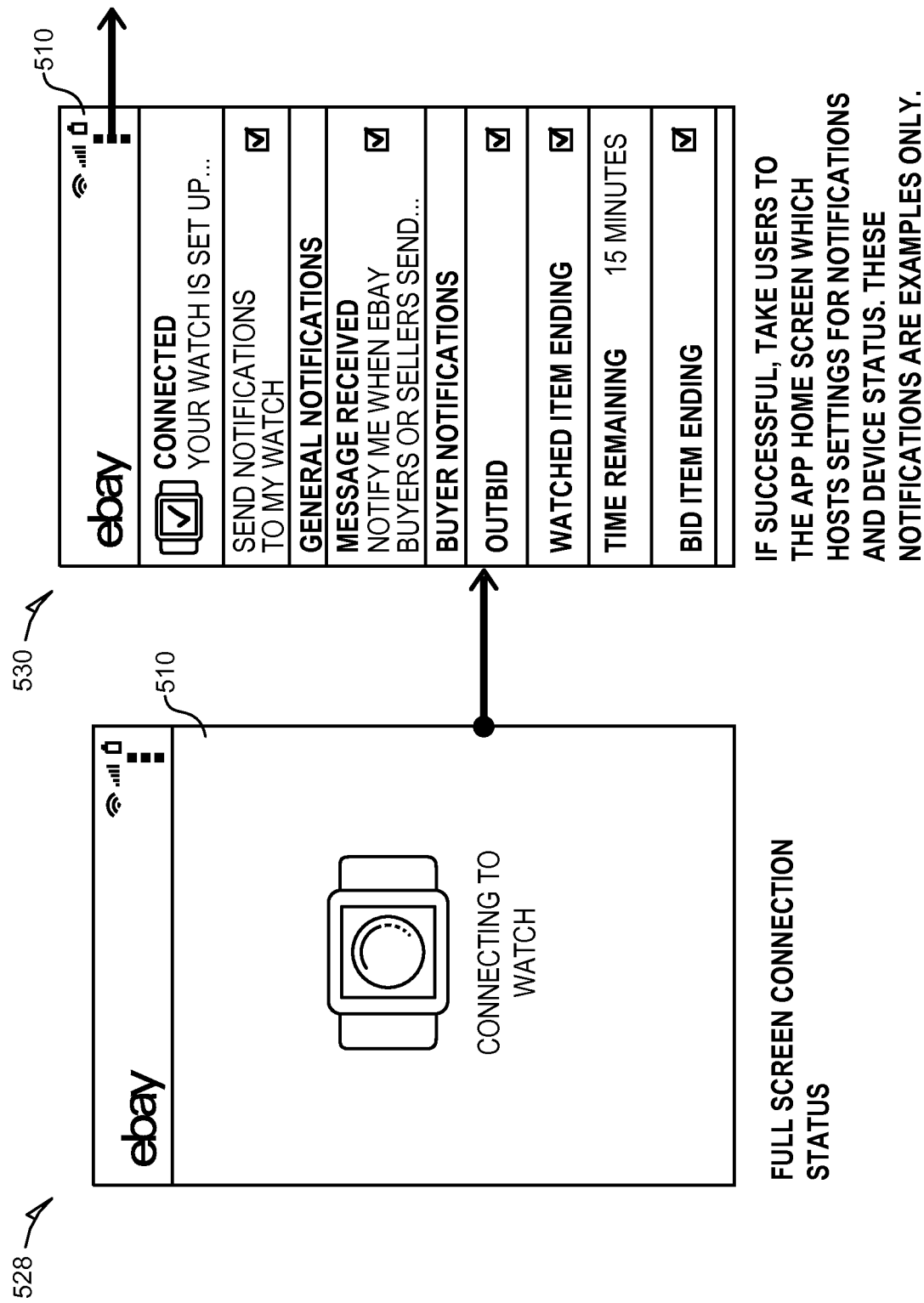
Figure 5D:
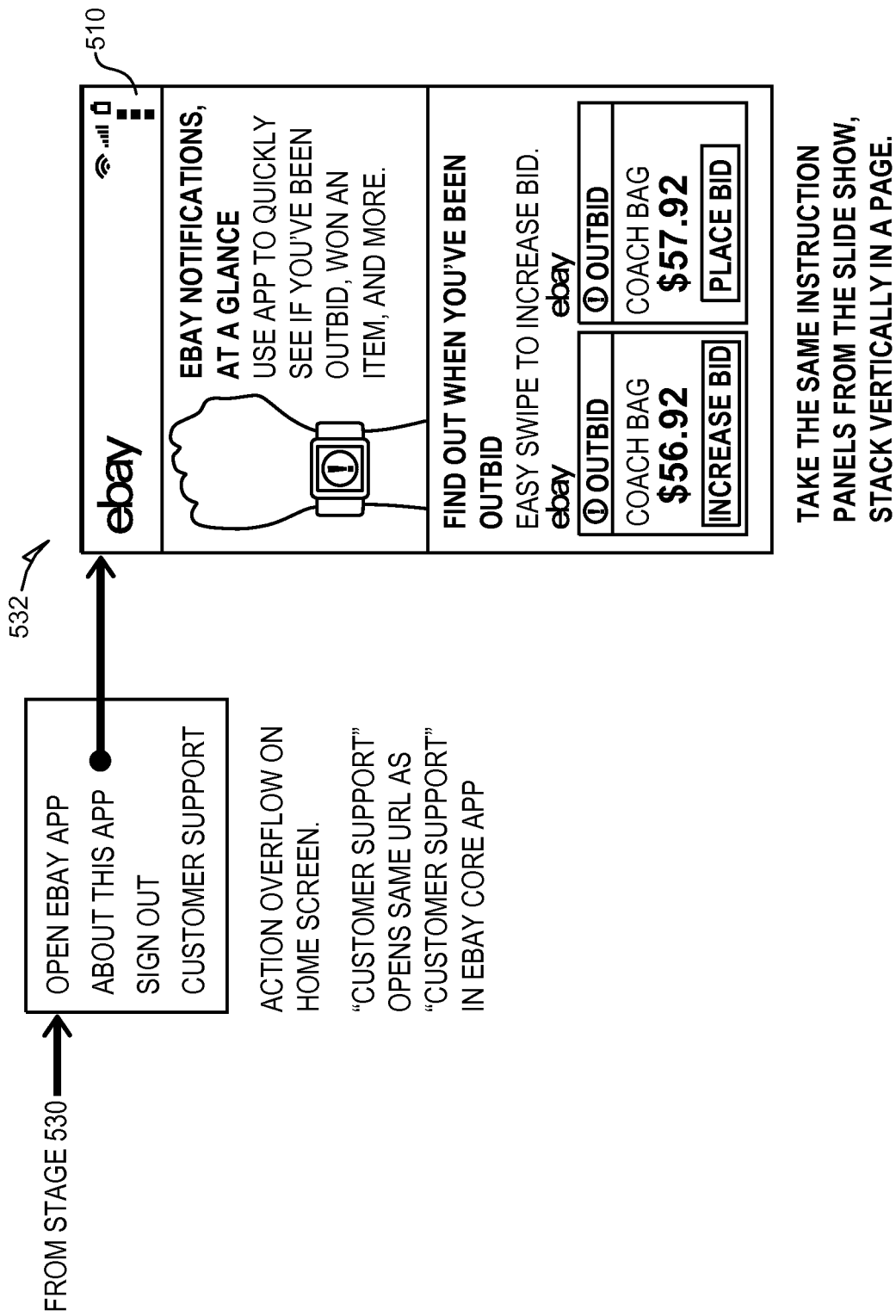

FIGS. 5A-5D illustrate different stages 520-532 of an application for a wearable device, in accordance with some embodiments. In FIGS. 5A-5C, a user interface 510 for the personal computing device 420 is shown at the different stages 520-532.

In FIG. 5A, at stage 520, the user interface 510 displays an introduction page if the user does not currently have an application corresponding to the features of the present disclosure installed on the personal computing device 420. The user can select a graphical user interface element for downloading the application, causing the personal computing device 420 to download and install the application. At stage 522, the user interface 510 displays a selectable graphical user interface element to enable the user to sign in to the application.

In FIG. 5B, at stage 524, the user interface 510 displays a sign in (log in) screen, enabling the user to sign in to the application, such as by entering a user ID and a password. At stage 526, in response to the user signing in to the application, the user interface 510 can prompt the user to connect features of the application, such as the notifications disclosed herein, with a wearable device, such as the user's smartwatch. A determination of which wearable device to connect features of the application with can be made by the application on the personal computing device 420 using any one of a variety of device detection mechanisms. For example, the application can use Bluetooth technology to determine the wearable device to which it will connect.

In FIG. 5C, at stage 528, in response to the user selecting to connect the features of the application to a wearable device, the user interface 510 can display a notification that an attempt is being made to establish a connection with the wearable device, such as by showing a connections status. At stage 530, in response to a connection between the features of the application and the wearable device being successfully established, the user interface 510 can display a home screen for the application. The home screen can provide setting options for notifications, as well as status of a connection between the application and the wearable device. Additionally, the user can be provided with a menu from which the user can select menu options. For example, the user can select a menu option to learn more about the application by having the user interface 510 display information about the application, as shown at stage 532 in FIG. 5D.

FIGS. 6A-6D illustrate different stages 620-640 of an application for a wearable device, in accordance with some embodiments. In FIGS. 6A-6D, a user interface 610 for a wearable device 410 is shown at the different stages 620-640.

Figure 6A:
FIGS. 6A-6D illustrate different stages of an application for a wearable device, in accordance with some embodiments.

In FIG. 6A, at stage 620, the user interface 610 displays a menu of notifications, such as, for example, a notification that the user has been outbid on an item being offered for sale (e.g., via an auction), a notification that the user is the highest bidder on an item for sale, a notification that the user has sold an item or that an item the user was watching has been sold, a notification that the user has placed a bid on an item for sale, a notification that an item that the user may be interested in has recently been listed (e.g., within a last hour, or some other predetermined amount or window of time), or a notification that the user has completed a checkout for the purchase of an item. The user interface 610 can provide these notifications as selectable graphical user interface elements to enable the user to select them and explore them in more detail. While various notifications are shown in FIG. 6A, it is noted that not all of these notifications may be shown at the same time. Additionally, more than one type of notification may be presented at the same time (e.g., two notifications regarding bids placed).

Figure 6B:

In FIG. 6B, at stage 622, the user interface 610 can display a notification that the user has been outbid on an item for sale (e.g., an auction item). This notification can be displayed in response to the user selecting to view additional information about the notification from the menu of notifications at stage 620 (e.g., selecting the graphical user interface element for the outbid notification). The notification can include details, such as a title of the item, a description of the item, and a current winning bid price of the item. The notification can also provide an option to the user to increase his or her bid price by simply swiping the touchscreen of the wearable device (or by using some other user input mechanism on the wearable device). At stage 624, the user has swiped the screen to increase the bid, and the user interface 610 displays a new bid for the user, as well as a selectable graphical user interface element to place the new bid. At stage 626, the user has selected to place the new bid, and the user interface 610 displays a notification that the new bid is being placed. At stage 628, the user interface 610 can display a notification to the user that the new bid of the user was outbid by another bid by another user.

Figure 6C:
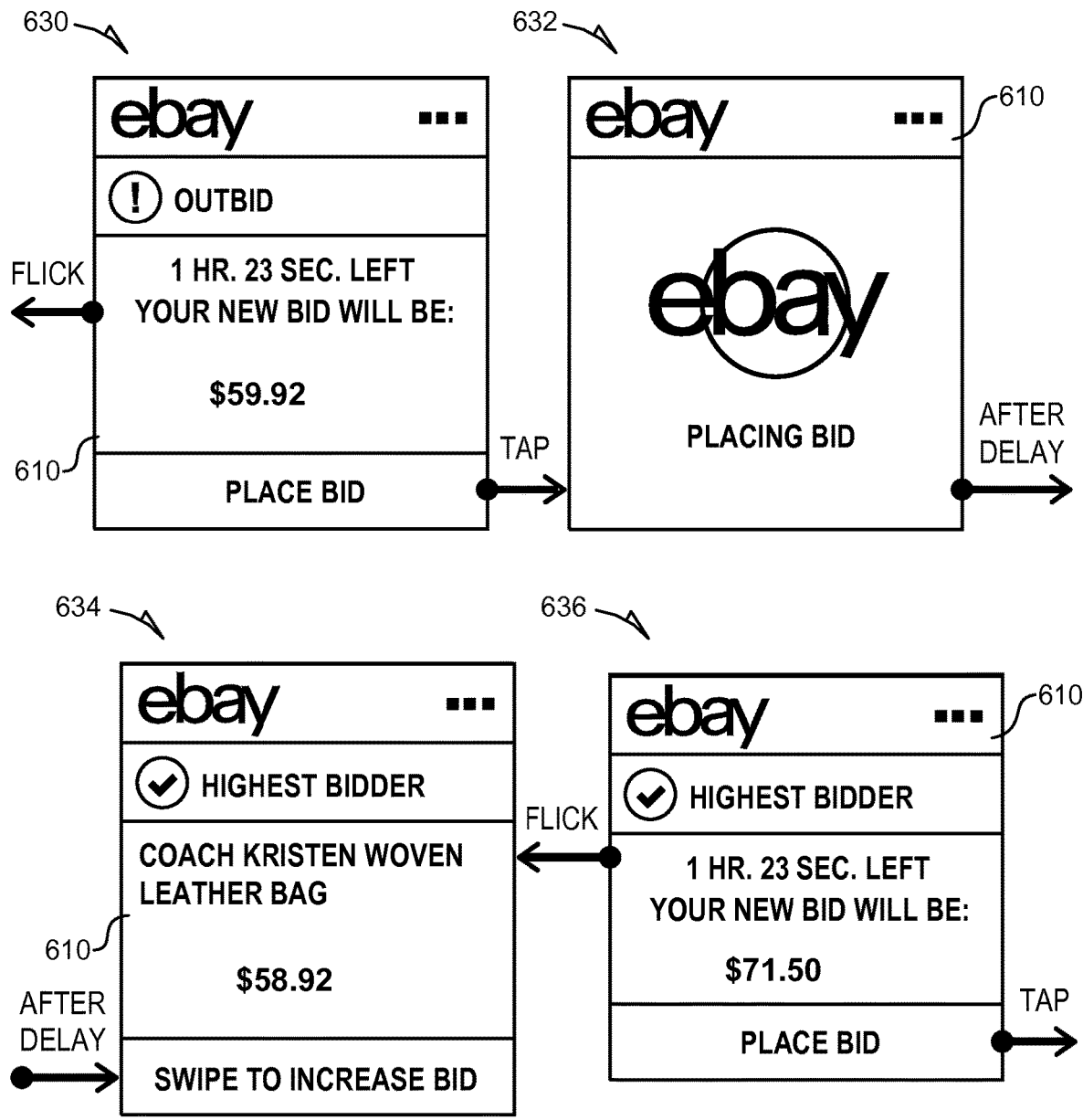

In FIG. 6C, at stage 630, the user interface 610 can provide the user with the selectable option of incrementing his or her bid on the item simply by selecting a graphical user interface element (or some other user input mechanism on the wearable device). At stage 632, the user interface 610 can display a notification that the new increased bid is being placed. At stage 634, the user interface 610 can display a notification that the user is now the highest bidder for the item based on the newly placed bid. The notification can also allow the user to increase his or her current bid or increase a maximum amount for a proxy bid, even though the user is currently the highest bidder. At stage 636, the user interface 610 can provide notification details of a proposed increase in the user's bid for the item, and enable the user to place the newly proposed bid.

Figure 6D:
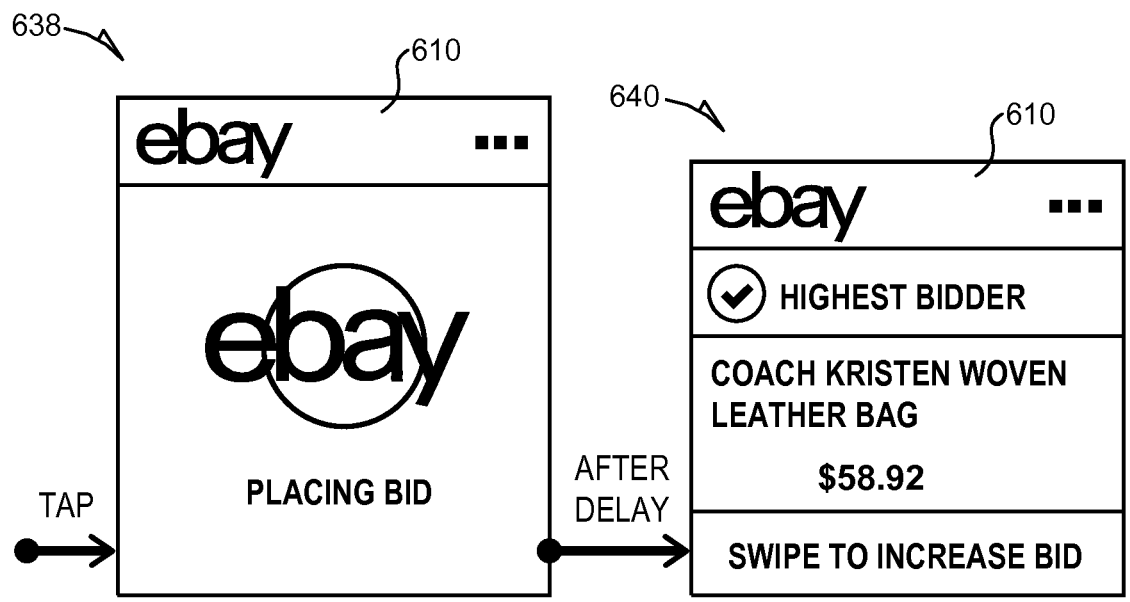

In FIG. 6D, at stage 638, the user interface 610 can display a notification that the newly proposed increased bid is being placed on the user's behalf. At stage 640, the user interface 610 can display a notification that the user is still the highest bidder for the item.

FIGS. 7A-7L illustrate different stages of an application for a wearable device, in accordance with some embodiments. The process flow shown in FIGS. 7A-7L spans different levels of interaction, including: (a) Top Level; (b) Item Level; (c) More Info/Actions Level; and (d) Phone Activity.

Figure 7E:
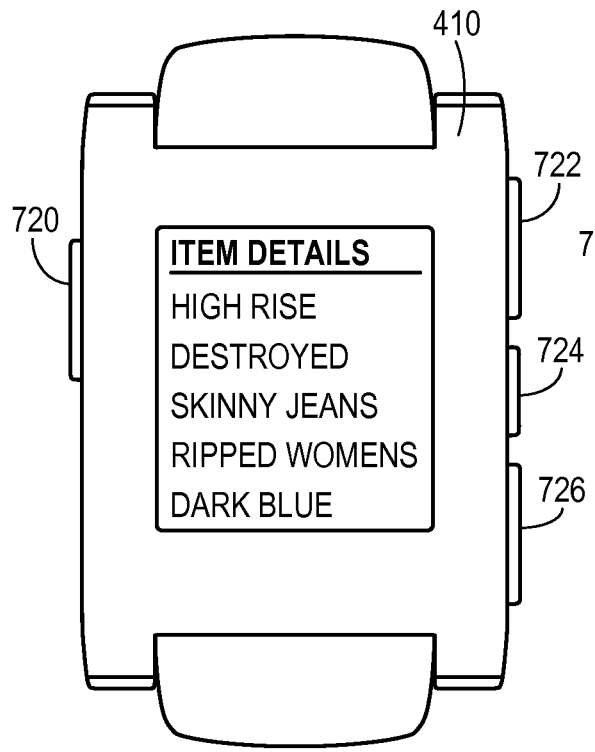

In FIG. 7A, a splash screen can be displayed on a display screen 710 of the wearable device 410. The user of the wearable device 410 can provide login information (e.g., a username or other ID, as well as a corresponding password) for authentication purposes. Information tailored for that user can then be presented on the display screen of the wearable device 410. The wearable device 410 can comprise buttons 720, 722, 724, and 726, or other input mechanisms configured to enable the user of the wearable device 410 to cause the wearable device module 212 to perform the operations discussed herein. It is contemplated that different numbers and configurations of buttons, or other input mechanisms, other than that shown in FIGS. 7A-7L are within the scope of the present disclosure.

In FIG. 7B, a feed interest menu comprising one or more categories of feed interests (e.g., All interests, Womens Denim, Shriek Chic) can be displayed on the display screen 710. The feed interest menu can be tailored specifically for the user based on one or more input signals related to the user. These input signals may the user's behavioral history with respect to one or more specified websites or online service, which may include, but is not limited to, the user's history of browsing, watching, liking, sharing, bidding, or purchasing items or other online content. The input signals may also include contextual signals indicating a certain context that the user is in. Examples of such contextual signals include, but are not limited to, the user's current location (which may be determined by the location of the wearable device 410 via GPS, Bluetooth Low Energy (BLE), check-in, WiFi or cellular triangulation, LTE Direct, and/or other location determination methodologies) and the current time.

These and other input signals can be used to determine what feed content (e.g., feed interest categories, feed items) to present to the user in a feed specifically configured for the user's wearable device 410. These input signals can be received from one or more websites or online services (e.g., e-commerce sites). In some embodiments, the wearable device module 212 is configured to use the input signals as filter mechanisms to reduce a size of a feed that would otherwise be present to the user on another device. For example, a feed that is ordinarily presented to the user when the user visits a website using a laptop computer may be reduced and reconfigured using the input signals in order to provide a more efficient feed to the user on the wearable device 410. This modified feed can be configured to present content that is the most relevant to a user's current context. For example, if a user is wearing the wearable device 410 at a concert venue, the wearable device module 212 may use a determination of the user's location to surface items (e.g., artist merchandise) related to the concert venue (e.g., based on the user's location) and any of the artists currently performing at the venue (e.g., based on the current time and knowledge of a performance schedule) on the wearable device 410. In another example, if the user is wearing the wearable device 410 in a store, the wearable device module 212 may use a determination of the user's location to surface items related to that store on the wearable device 410. Other examples are also within the scope of the present disclosure.

In some embodiments, the wearable device module 212 can determine the user's current location (e.g., the location of the wearable device 410), and then surface keyword-based interests on the wearable device 410 based on the determined location. Keywords can be determined based on the determined location. For example, one or more keywords can be stored in a database in association with one or more locations. These keywords can then be accessed and retrieved in response to the determination of the user's location. A search can then be performed using these keywords. For example, these keywords can be used by a search engine of an e-commerce website to obtain relevant items. These items can then be presented to the user on the wearable device 410 as temporary interests.

In one example, the wearable device module(s) 212 can determine that a user is attending a specific band's concert based on the location of the user. For example, the wearable device module(s) 212 can determine that the user is currently at a specific concert venue (e.g., a stadium) and then perform a search on that venue to determine whether there is a concert scheduled for the venue for a certain period of time corresponding to the user's presence at the venue. The wearable device module(s) 212 can determined based on the search that a specific band is performing at the venue the user is attending during the period of time corresponding to the user's presence at the venue. The wearable device module(s) 212 can then search for content associated with, or otherwise corresponding to, that specific band and transmit the content to the wearable device 410, where the content can be displayed on the wearable device 410 to the user. For example, the wearable device module(s) 212 can determine item listings for CD's, t-shirts, posters, or other merchandise of the band to present to the user on the wearable device 410. The wearable device module(s) 212 can be configured to provide this location-based content for only a predetermined amount of time (e.g., 2 days) after the user has left the location in order to take advantage of the relevance of such location-based content without.

The wearable device feed module 212 can use contextual awareness to surface a certain portion of a feed that would be provided to the user on another device. It can determine what portion of the feed the user is going to be most interested in interacting with at that specific time, and then present that portion to the user on the wearable device 410.

In some embodiments, the feed interest menu may be presented to the user only on a first-time application entry. On subsequent uses of the application, the feed interest menu can skip to the Item Level stage (shown in FIG. 7C) as the home screen for the application and only show the feed interest menu when a back button is pressed.

In response to a user selection, via an input mechanism, of one of the feed interest categories in the feed interest menu of FIG. 7B, a first item in the selected feed interest category may be displayed on the display screen of the wearable device 410.

FIG. 7C shows the first item in the feed as an item for sale for a specified price ($34.66). The user can proceed to a next item in the feed, via a selection using an input mechanism. FIG. 7D shows another item for sale for a specified price ($29.95).

The user can be provided with more information regarding an item in the content feed. In FIG. 7E, details (e.g., High Rise, Destroyed, Skinny Jeans, Ripped Womens, Dark Blue) about the first item in FIG. 7C are displayed on the wearable device 410. These details can be displayed in response to the user providing input (e.g., pressing a button) to request additional information about the item.

Figure 7F:
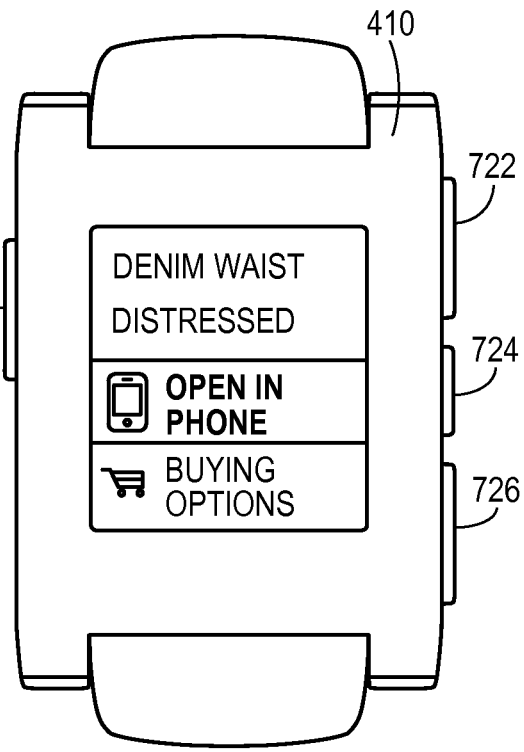
Figure 7G:
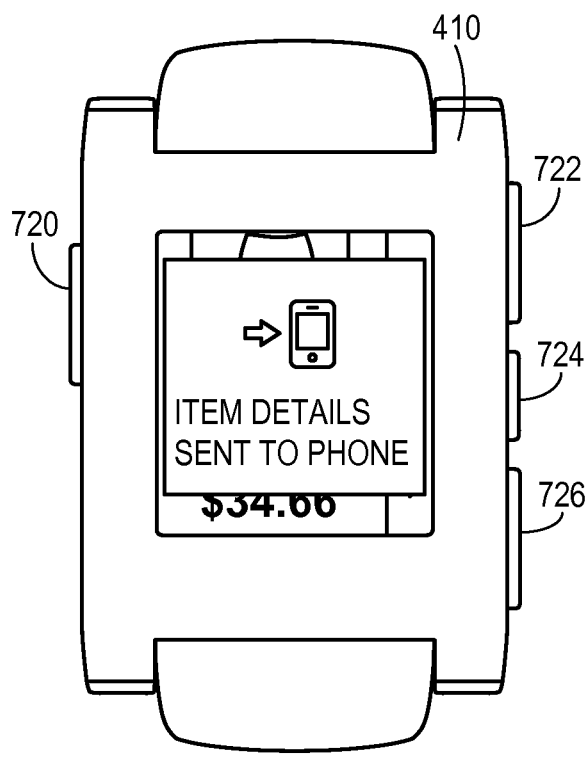

The user can scroll down to view additional content or options, such as those shown in FIG. 7F. In FIG. 7F, additional details (e.g., Denim Waist, Distressed) about the item are displayed, as well as additional functional options (e.g., Open in Phone, Buying Options). One functional option is for the information about the currently viewed item to be opened and displayed on another device, such as the user's smartphone. In FIG. 7G, the user has selected to send the item details to the user's smartphone.

Figure 7H:
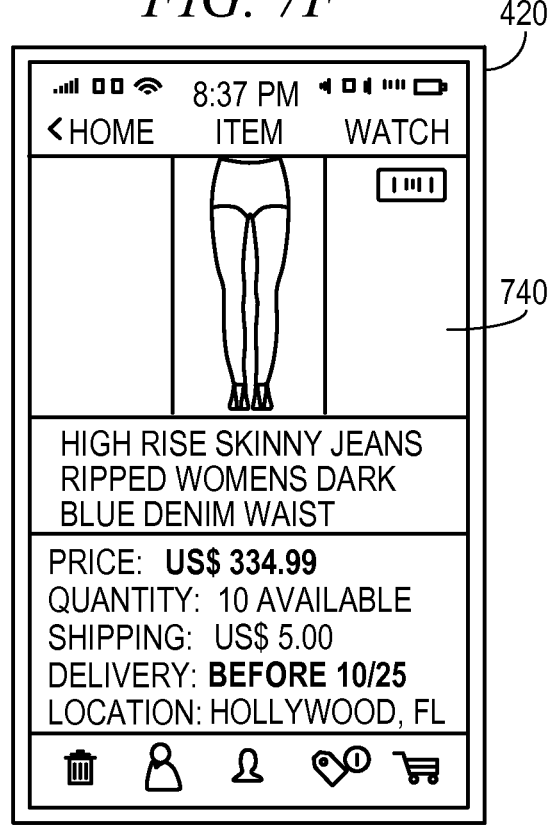

In FIG. 7H, the item details are displayed on a display screen 740 of the user's smartphone 420. As a result of the larger screen size on the smartphone 420, the smartphone 420 may display more information about the item than was displayed on the wearable device 410.

Figure 7I:
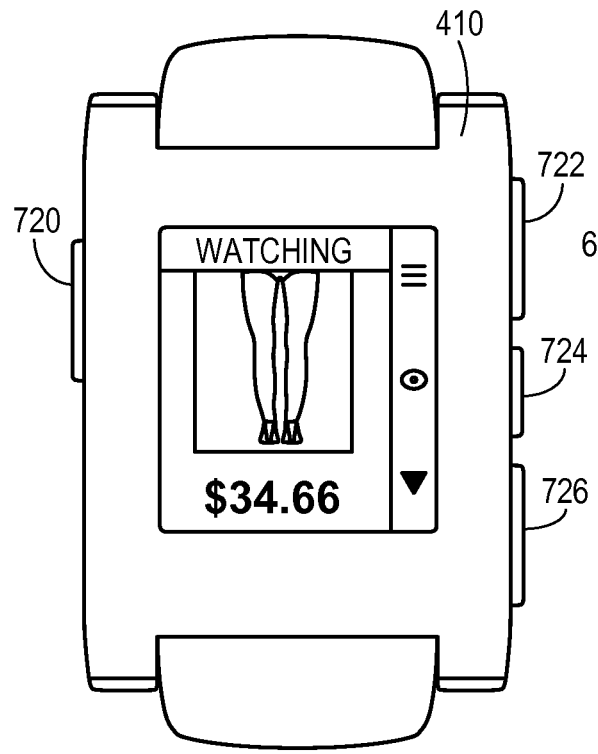

Referring back to the Item Level shown in FIG. 7C, the user can select to watch an item. In FIG. 7I, the user has selected to watch the item in FIG. 7C. The user's selection to watch the item can be communicated to another machine or device, such as the smartphone 420 (or other personal computing device 420 of the user) or the e-commerce site hosting the sale of the item, so that information related to the user watching the item can be provided to the user when the user is using another device (e.g., when the user accesses the website selling the item via the smartphone 420 or a laptop computer). In some embodiments, the user's actions with respect to the feed on the wearable device 410 can affect any feed provided to the user on any other coupled or registered device and vice-versa.

In some embodiments, the wearable device feed module 212 can track where a user (e.g., the user's wearable device 410) has gone during the day, so that when the user logs into a corresponding website via a larger device (e.g., a smartphone, tablet computer, desktop computer, laptop computer), the user is provided with suggested interests based on those places that he or she traversed during the day, thereby providing a recap of the user's day with those things that he or she may want to re-live in item or product form.

Figure 7J:
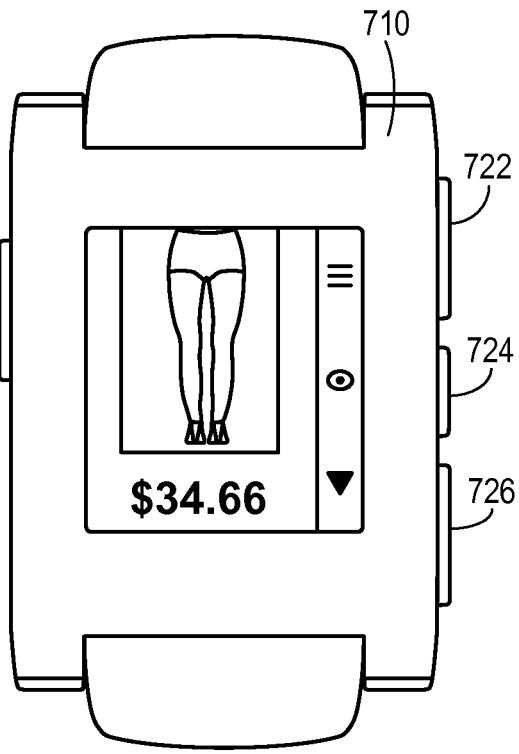

In some embodiments, the user can toggle between watching and unwatching an item using an input mechanism (e.g., button 724) on the wearable device 410. In FIG. 7J, the user has selected to unwatch the item by selecting the button 724.

Figure 7K:
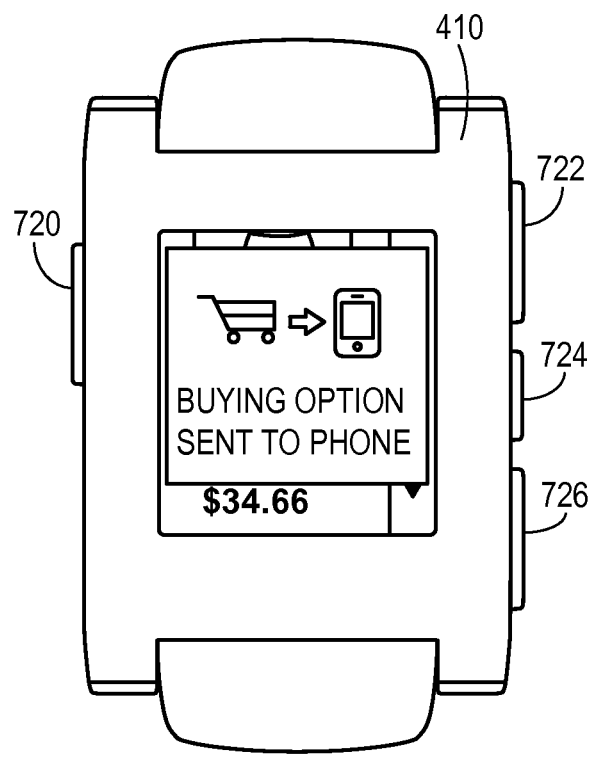
Figure 7L:
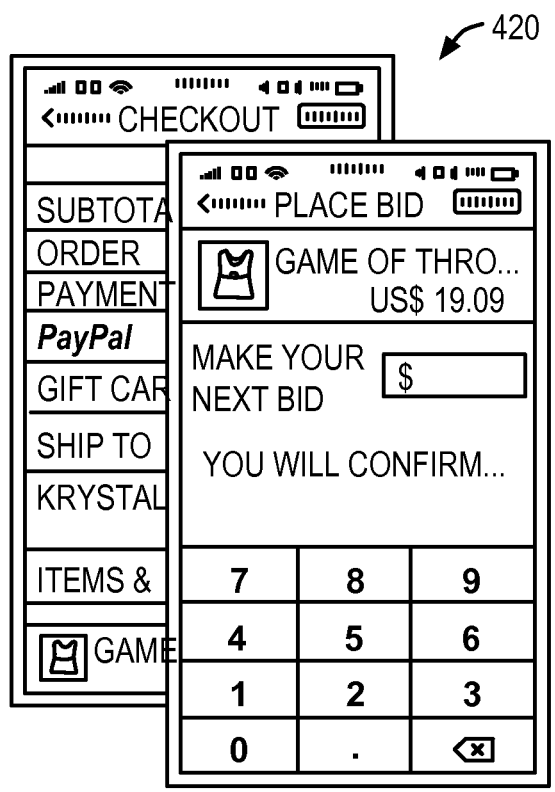

Referring back to FIG. 7C, the user can select to have buying options for the item sent to another device, such as the user's smartphone 420. In FIG. 7K, the user has selected, via an input mechanism (e.g., button 724) to have buying options for the item sent to the user's smartphone 420. In FIG. 7L, the buying options for the item have been sent to the user's smartphone 420. The user can then proceed to select certain buying options and complete the purchase of the item using the smartphone 420.

In some embodiments, the user of the wearable device 410 can be enabled to create a feed interest (e.g., a name of a subject, category, or anything else the user wants to receive information on via a feed) from the wearable device 410. The user can create the feed interest using one or more input mechanisms on the wearable device 410, and create an association between the created feed interest and a particular location, such as the user's location at the time the feed interest is being created. The user can also set an expiration date for the created feed interest. Feed content determined to be related to this feed interest can then be provided to the user on the wearable device 410. In some embodiments, the feed content related to this feed interest will be presented to the user on the wearable device 410 in response to a determination that the user (or the wearable device 410) is within a particular distance of the associated location. In some embodiments, the presentation of the feed content can also be conditioned upon a determination that the expiration date has not yet passed. In some embodiments, this created feed interest can be made available to other users for presentation on their wearable devices. The user that created the feed interest can limit the presentation of the created feed interest to only particular users that he or she specifies, can set place and time restrictions for the other users, or can make the created feed interest available to all users.

Figure 8:
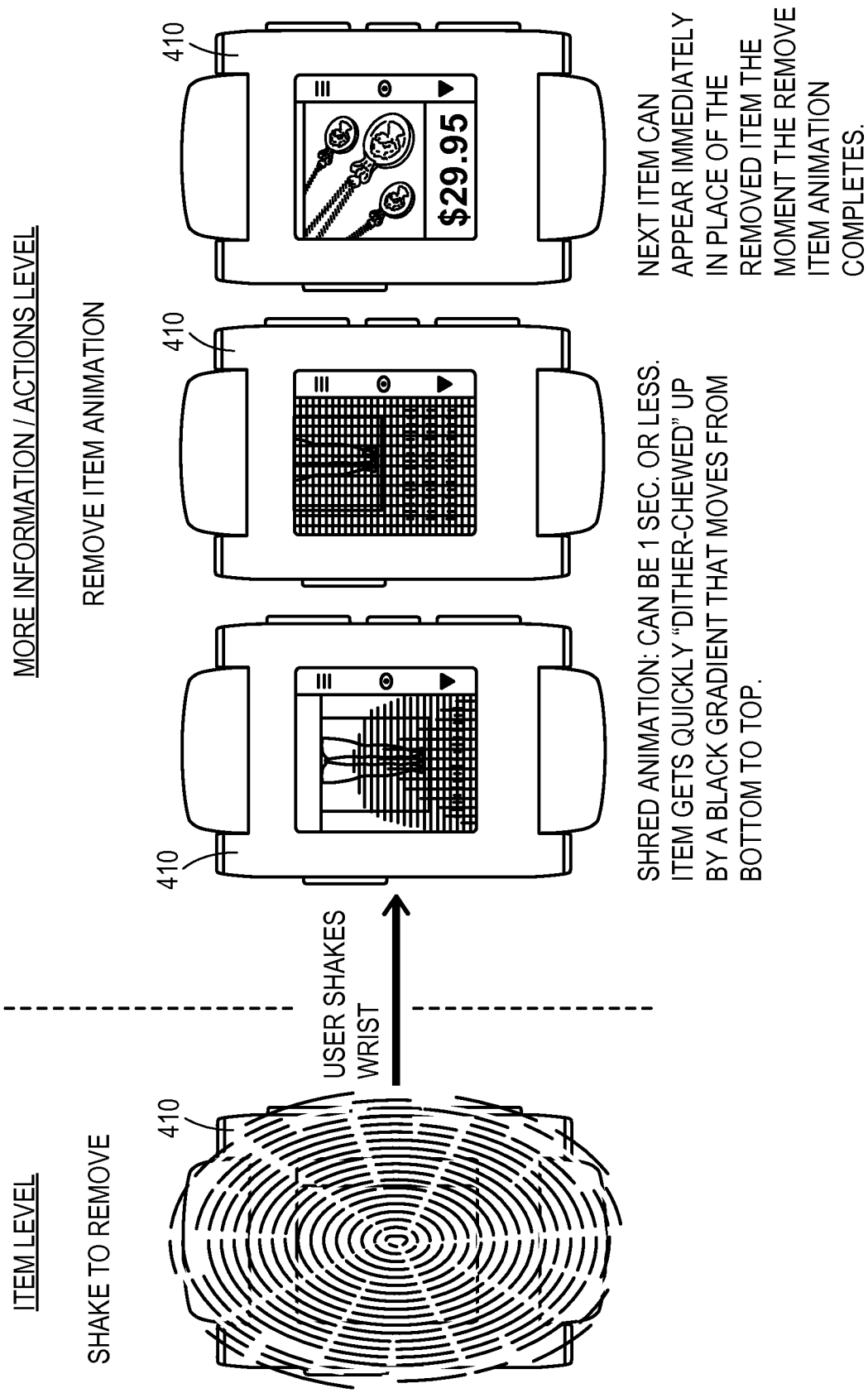
FIG. 8 illustrates different stages of providing an online content feed on a wearable device, in accordance with some embodiments.

FIG. 8 illustrates different stages of providing an online content feed on the wearable device, in accordance with some embodiments. In FIG. 8, the user can remove an item being displayed in the feed on the wearable device 410 by manipulating the wearable device 410. For example, the user can shake the wearable device 410, thereby causing the feed item currently being displayed to be replaced with another feed item. In some embodiments, a predetermined minimum threshold level of movement can be employed to determine whether or not the user intended to manipulate the wearable device 410 in a way to cause an action to be performed by the application on the wearable device 410 (e.g., the feed item currently being displayed to be replaced with another feed item). The application on the wearable device 410 can use data from any combination of one or more sensors (e.g., a gyroscope, an accelerometer) on the wearable device 410 in order to determine a level of manipulation of the wearable device 410 by the user.

Figure 9:
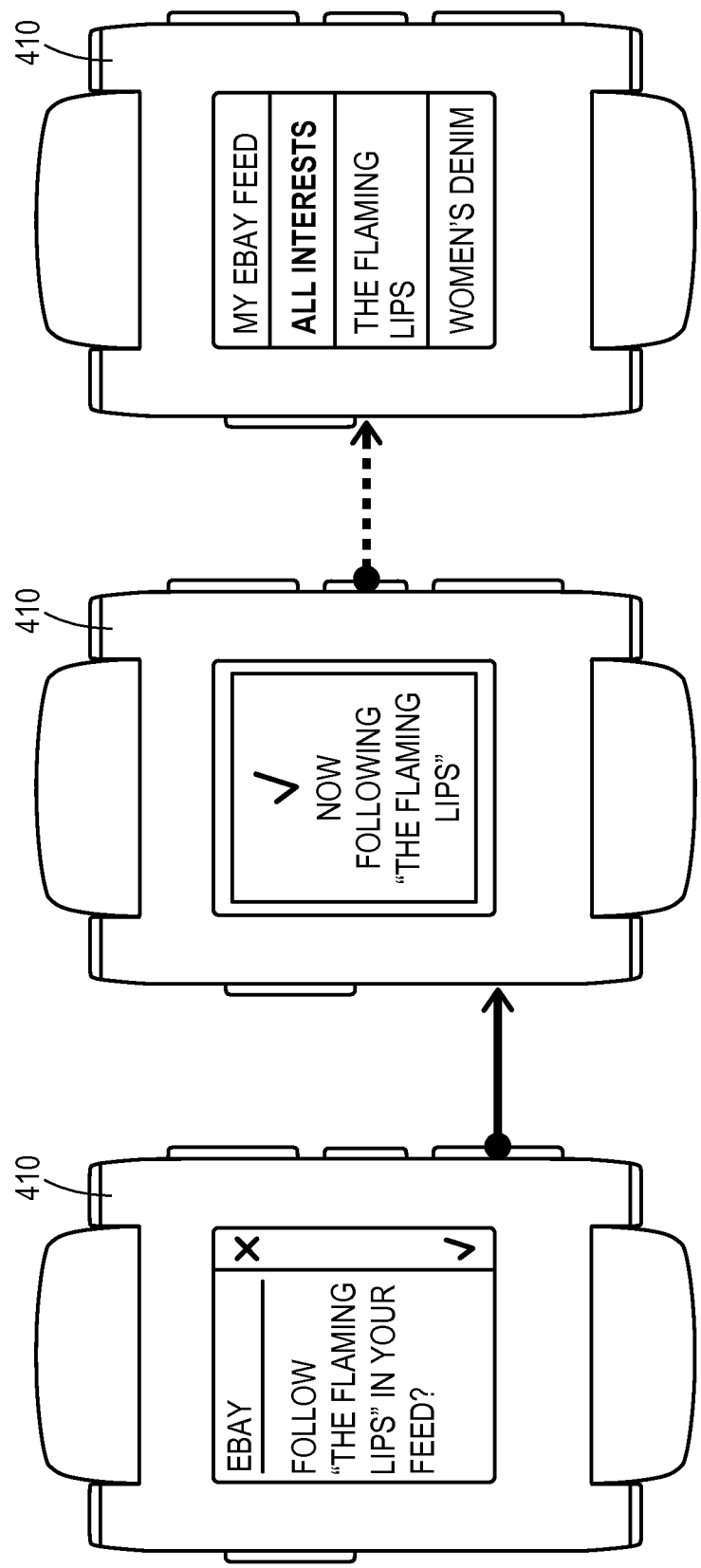
FIG. 9 illustrates different stages of providing an online content feed on a wearable device, in accordance with some embodiments.

FIG. 9 illustrates different stages of providing an online content feed on the wearable device, in accordance with some embodiments. In some embodiments, the user can be prompted with an option of following content related to a specified subject. This prompt may be provided in response to a determination based on contextual signals, such as those previously discussed. For example, as seen in FIG. 9, in response to the wearable device feed module 212 determining that the user is at a concert for a particular band (e.g., The Flaming Lips), such as via a geofence associated with that particular concert, the user can be prompted to follow that particular band. In response to the user selecting to follow that particular band, the user can be provided with confirmation that he or she is now following that particular band. The user's feed interest menu can then be updated to reflect that particular band as a feed interest category for the user. Items that are determined to be related to that feed interest category (e.g., The Flaming Lips) can then be included in the feed on the wearable device 410. It is contemplated that other types of content can be followed by the user and included in the feed on the wearable device 500.

Figure 10:
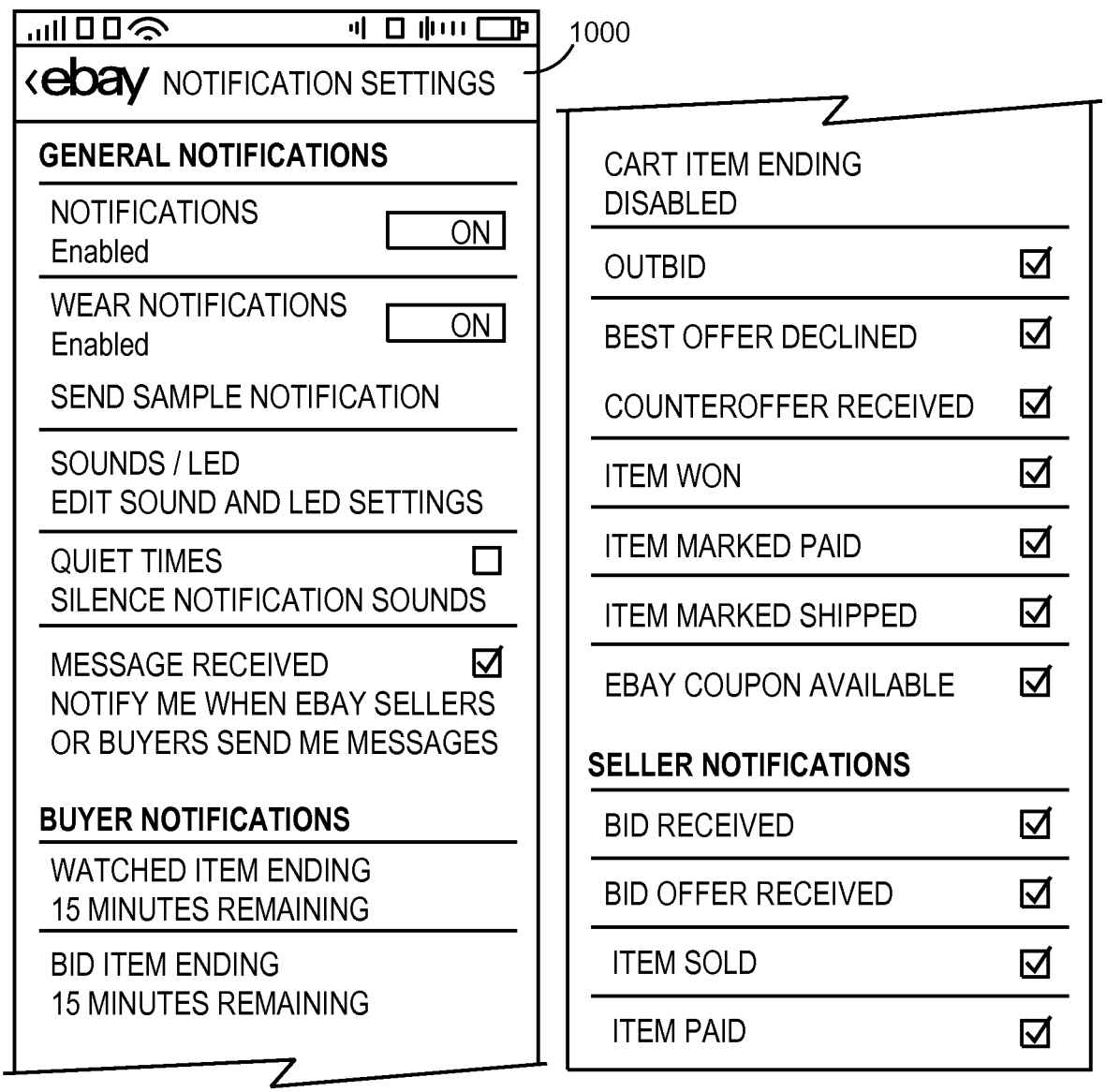
FIG. 10 illustrates a user interface for managing notification settings for a wearable device application, in accordance with some embodiments.

FIG. 10 illustrates a user interface 1000 for managing notification settings for a wearable device application, in accordance with some embodiments. The notification settings can correspond to and be applied to one or more specified user accounts or to one or more specified wearable devices of one or more specified users. For example, in some embodiments, a user can register his or her wearable device, thereby enabling the user to manage (e.g., modify or otherwise adjust) notification settings for one or more applications usable by (e.g., installed on, accessible via) the wearable device via the user interface 1000. As seen in FIG. 10, the notification settings can include, but are not limited to, settings for general notifications, settings for buyer notifications, and settings for seller notifications.

Settings for general notifications can include, but are not limited to, whether notifications are generally enabled (no matter what device they are for), whether notifications for wearable devices are enabled, what sounds or visual indications to use for notifications, whether to silence the notifications, and whether to notify the user when a seller or buyer on an online marketplace has sent the user a message.

Settings for buyer notifications can include, but are not limited to, whether or when to notify the user that the availability of a watched item is ending (e.g., notify the user when there are 15 minutes remaining on an auction for a watched item), whether or when to notify the user that the availability of an item the user has bid on is ending, whether or when to notify the user that the availability of an item in the user's shopping cart is ending, whether to notify the user when the user has been outbid on an item, whether to notify the user when the use's best offer has been declined, whether to notify the user when the user has received a counteroffer, whether to notify the user when the user has won an auction for an item, whether to notify the user when an item the user has paid for is marked (or otherwise recognized) as paid, whether to notify the user when an item has shipped, and whether to notify the user when a discount or incentive for an online marketplace is available to the user.

Settings for seller notifications can include, but are not limited to, whether to notify the user when a bid is received for an item the user is offering for sale on an online marketplace, whether to notify the user when a bid offer is received for an item the user is offering for sale on an online marketplace, whether to notify the user when an item the user is offering for sale on an online marketplace has been sold, and whether to notify the user when an item the user is offering for sale on an online marketplace has been paid for.

Figure 11A:
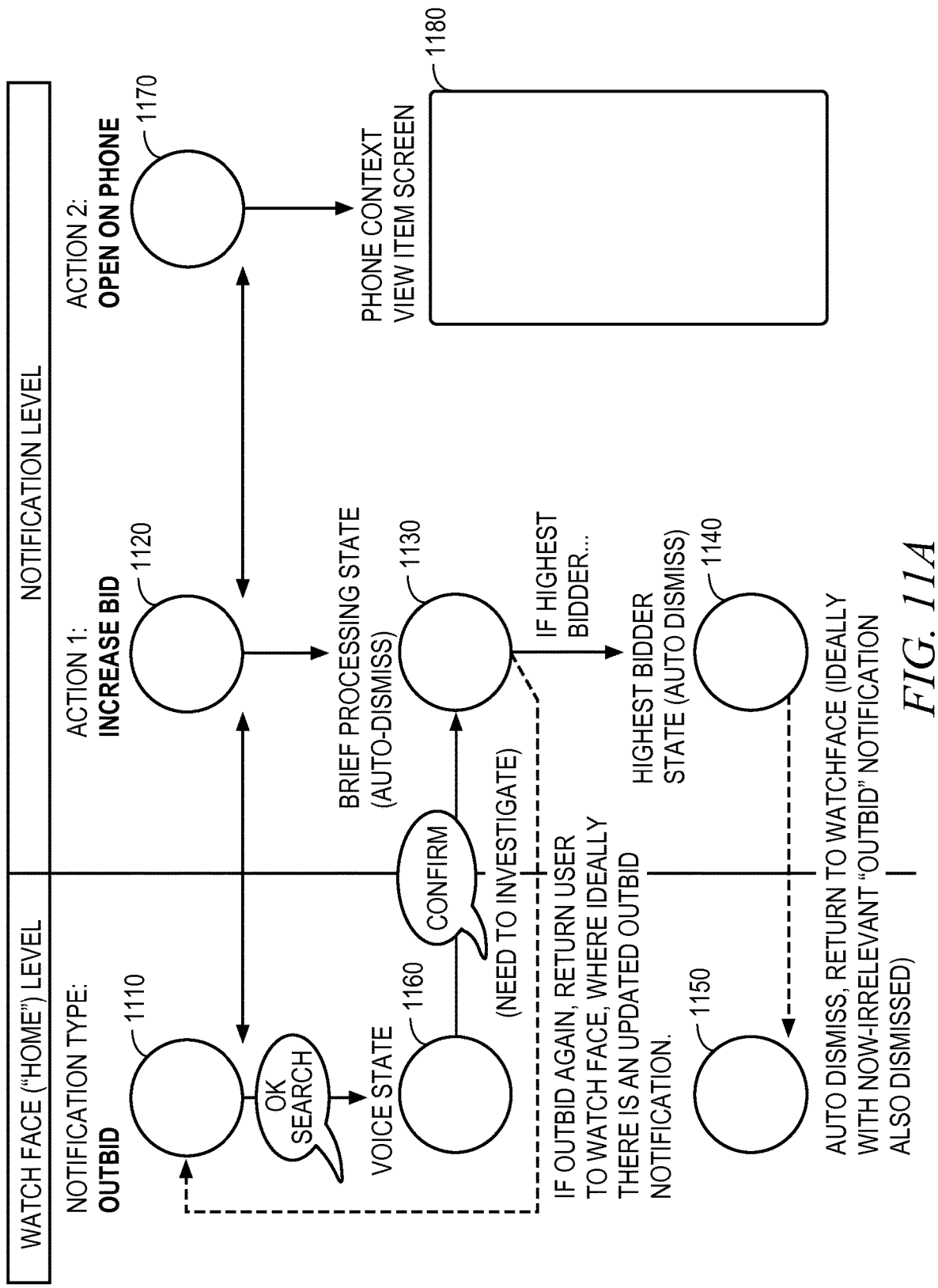
FIGS. 11A-11C illustrate different stages of applications for a wearable device, in accordance with some embodiments.
Figure 11B:
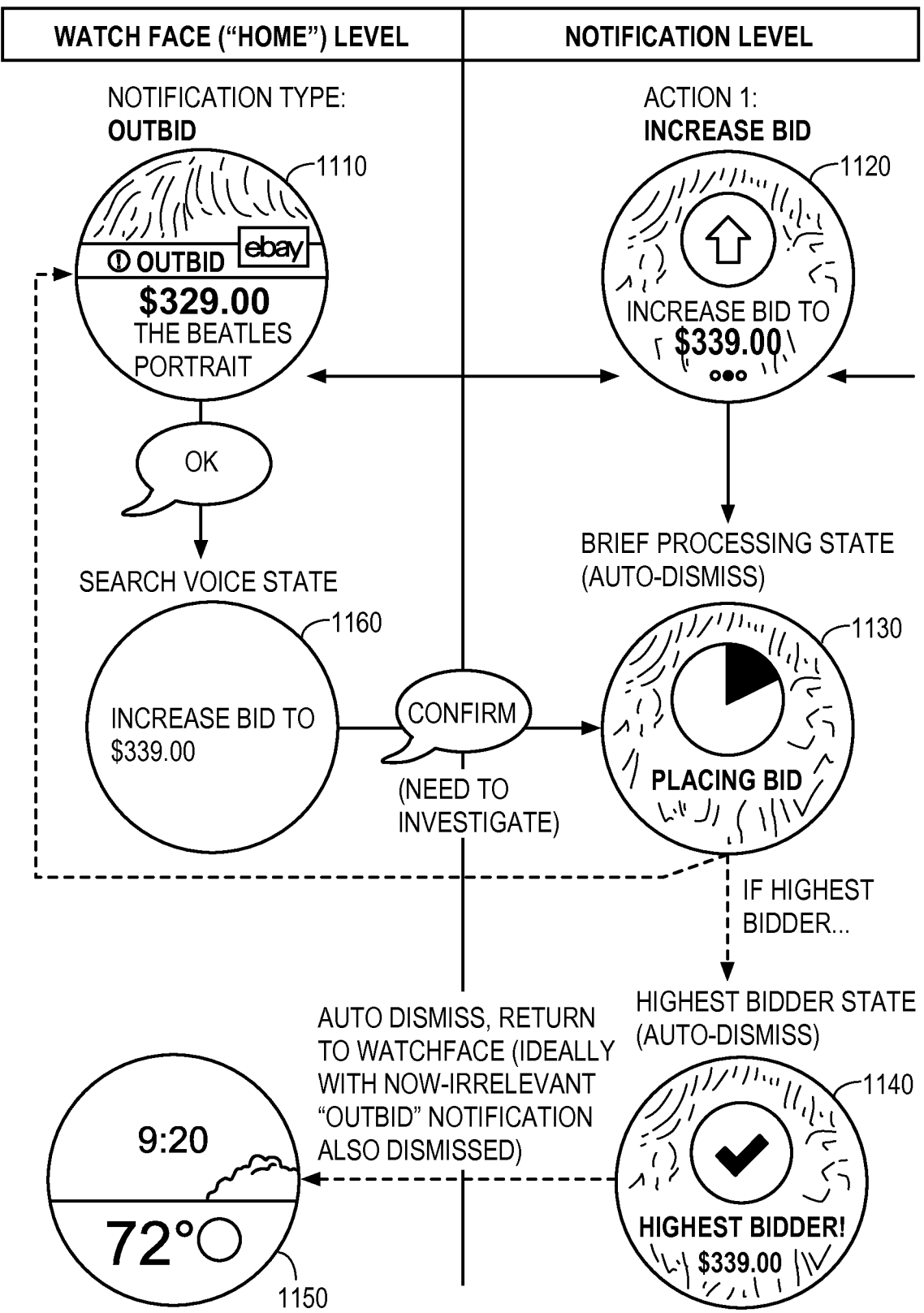
Figure 11C:
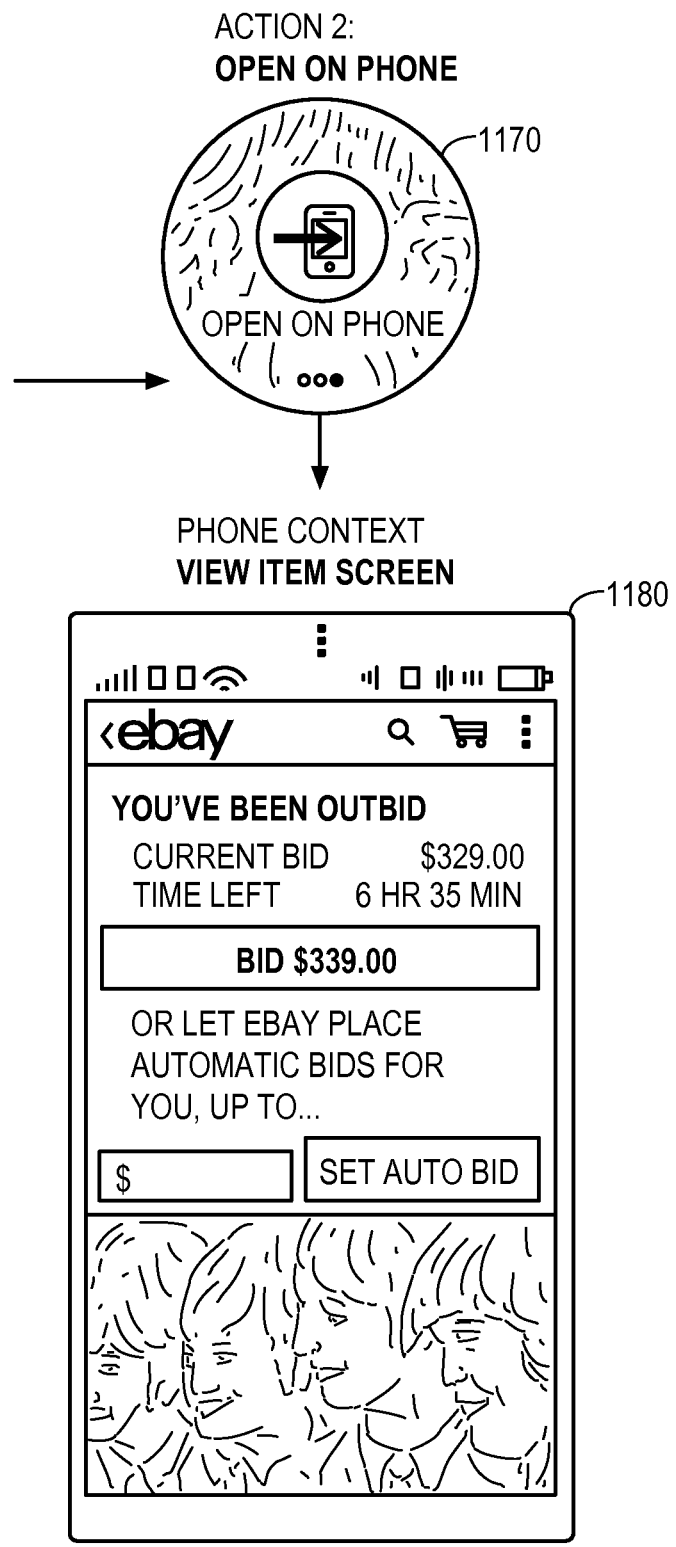

FIGS. 11A-11C illustrate different stages of applications for a wearable device, in accordance with some embodiments. FIG. 11A illustrates a comprehensive view of the different stages 1110-1180, while FIGS. 11B-11C illustrate close-up views of the different stages 1110-1180. As seen in FIGS. 11A-11C, throughout the stages, the user interface of the wearable device, which can be displayed on the face of the wearable device (e.g., on the face of a smartwatch), can transition between a home level, which can display home screen content an operating system of the wearable device, and a notification level, which can display additional details related to a notification being provided on the wearable device.

At stage 1110, the user interface displays a notification at the home level that the user associated with the wearable device has been outbid on an item being offered for sale via an auction on an online marketplace. The user can provide user input to trigger additional information regarding the notification to be presented on the wearable device, such as by touching the screen in a predefined location or by pressing a button on the wearable device. For example, the user can provide user input to trigger an option of increasing the user's bid on the item for which the user has been outbid.

At stage 1120, the user interface displays a selectable option for the user to increase the user's bid for the item. In some embodiments, the amount to increase the bid can be predetermined. For example, a default amount (e.g., $339.00 shown at stage 1120 in FIG. 11B) can be presented to the user. In some embodiments, the user can adjust the amount to increase the bid via user input (e.g., touch screen, mechanical buttons, voice recognition). The user can submit the increased bid using one or more user inputs. In response to the user's submission, the user interface may display a brief processing state, as seen at stage 1130.

In some embodiments, the user can trigger the option of increasing the user's bid by providing a voice command (e.g., "OK") at stage 1110. As a result, at stage 1160, the user interface can display a selectable option for the user to increase the user's bid for the item, similar to stage 1120. The user can then provide voice commands or instructions for increasing the bid. In response to the user's submission, the user interface may display a brief processing state, as seen at stage 1130.

At stage 1130, it can be determined whether or not the user's new increased bid is the highest bid for the item. If the user's bid is still not the highest bid, then another outbid notification can be presented to the user at stage 1110, informing the user of the new outbid price. If the user's bid is the highest bid for the item, then a notification can be provided to the user at stage 1140 informing the user that the user is now the highest bidder for the item. The user interface can then automatically return to the home level view (e.g., a watch face showing the time and temperature, as shown in FIG. 11B) at stage 1150.

In some embodiments, at stage 1120, the user can open the outbid notification on another device (e.g., a smart phone or a tablet computer). Thus, the user interface can provide the user with the option of opening the outbid notification on the other device, as seen at stage 1170. In response to a user input requesting that the outbid notification be presented on the other device, the outbid notification, along with additional details and options, can be presented on the other device, as seen at stage 1180, where the user interface displays the current highest bid for the item and selectable bid options for the user (e.g., "Bid $339.00" or "Set auto bid", as shown in FIG. 11C).

Figure 12A:
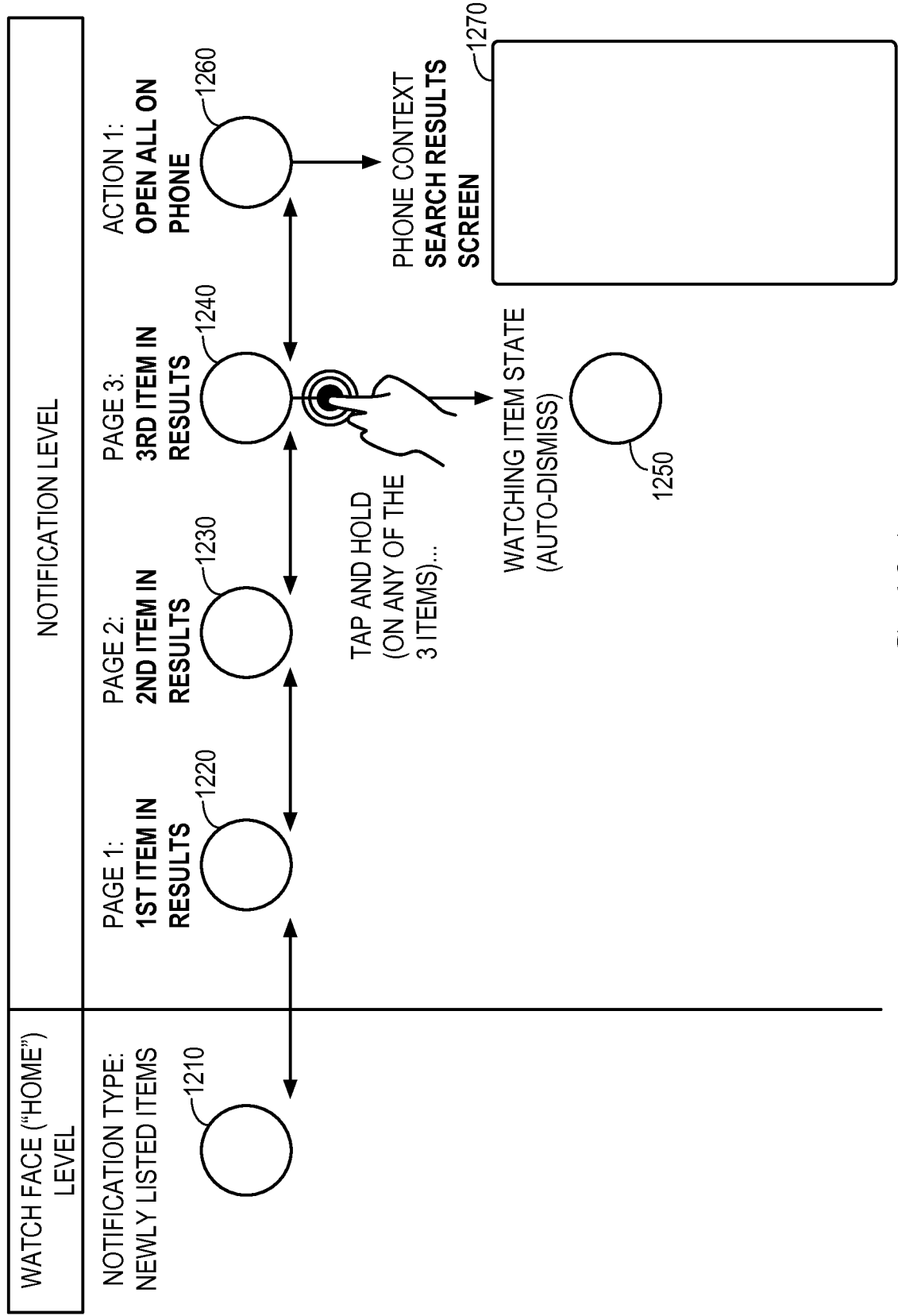
FIGS. 12A-12C illustrate different stages of applications for a wearable device, in accordance with some embodiments.
Figure 12B:
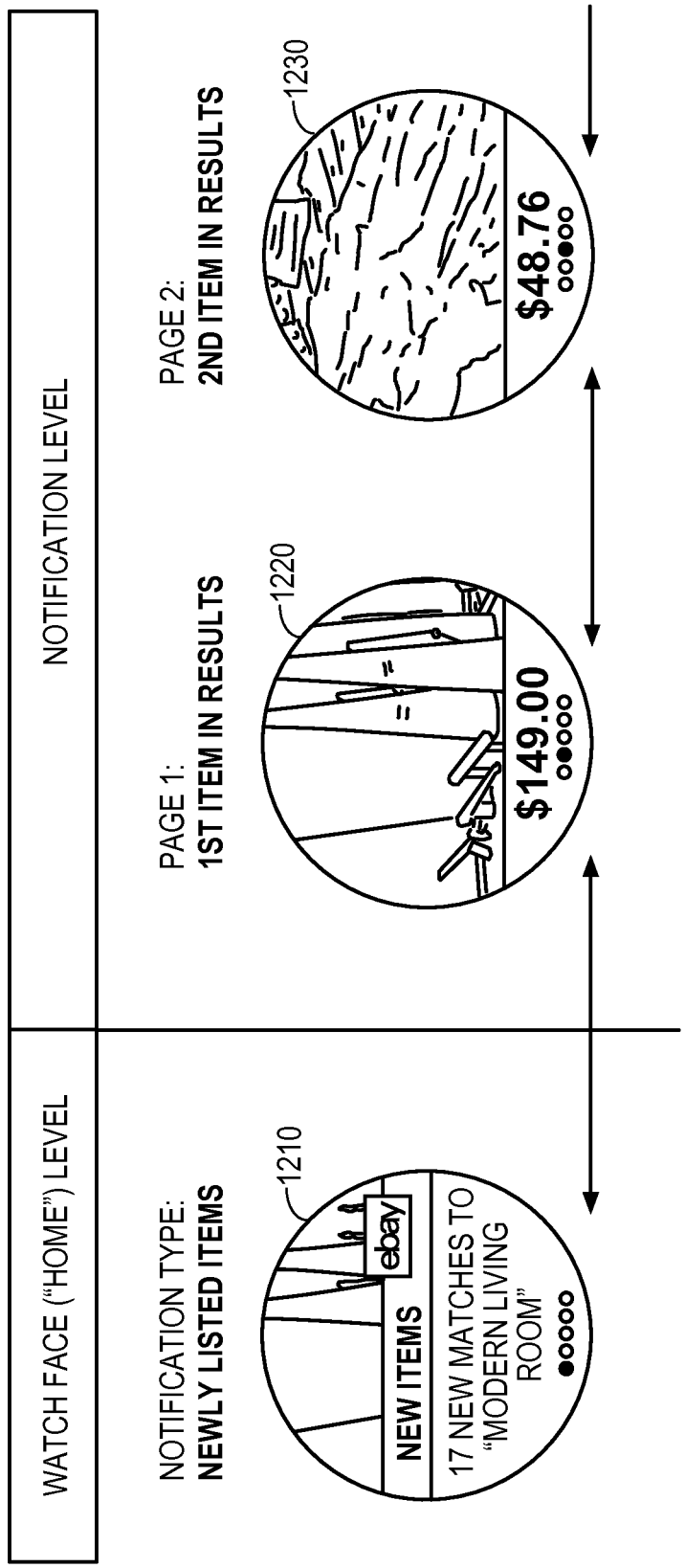
Figure 12C:
Figure 12C:
Figure 12C:
Figure 12C:

FIGS. 12A-12C illustrate different stages of applications for a wearable device, in accordance with some embodiments. FIG. 12A illustrates a comprehensive view of the different stages 1210-1270, while FIGS. 12B-12C illustrate close-up views of the different stages 1210-1270. As seen in FIGS. 12A-12C, throughout the stages, the user interface of the wearable device, which can be displayed on the face of the wearable device (e.g., on the face of a smartwatch), can transition between a home level, which can display home screen content an operating system of the wearable device, and a notification level, which can display additional details related to a notification being provided on the wearable device.

At stage 1210, the user interface displays a notification that there are items that have been newly listed on an online marketplace. In some embodiments, the items for which the user is notified can be determined based on the user's profile, behavior, or history. For example, the determination of what items or type of items to notify the user about can be based, at least in part, on the user's browsing, searching, or purchase history on the online marketplace or on other online sites. For example, if the user has a history of browsing for or purchasing concert posters, then the user can be provided with notifications of newly listed concert posters.

As can be seen at stages 1220, 1230, and 1240, the user can browse through the different newly listed items. At stage 1220, the user interface can display information about the first item of the newly listed items. This information can include, but is not limited to, an item title or name, a description of the item, an image of the item, and a price of the item. The user can then continue to view information about the other newly listed items, such as a second item at stage 1230 and a third item at stage 1240. In some embodiments, the user interface displays information about one item at a time, and the user can trigger the display of information of a different item by providing a user input. For example, while at stage 1220, the user can swipe the screen and be brought to stage 1230, where information about a different item of the newly listed items is presented. The user can then swipe the screen again to be brought to stage 1240, where information about yet another different item of the newly listed items is presents. And so on and so forth.

While information about one of the newly listed items is being displayed, the user can provide an input to trigger the system to place the item on a watchlist of the user. For example, the user can hold his or her finger on the screen for a predetermined amount of time (e.g., 3 seconds) in order to "watch" the item being displayed. The user interface can provide confirmation that the item is being "watched" by the user, as seen at stage 1250.

In some embodiments, the user interface can enable the user to select an option to have the newly listed items displayed on another device, as seen at stage 1260. For example, rather than browsing through the newly listed items one by one on a small screen of a wearable device, the user may want to view a list of the newly listed items on a larger screen of another device, such as a smartphone or a tablet computer. In response to receiving user input indicating that the user wants to view the newly listed items on another device, the system can provide the information of the newly listed items to the other device, as seen at stage 1270.

Figure 13A:
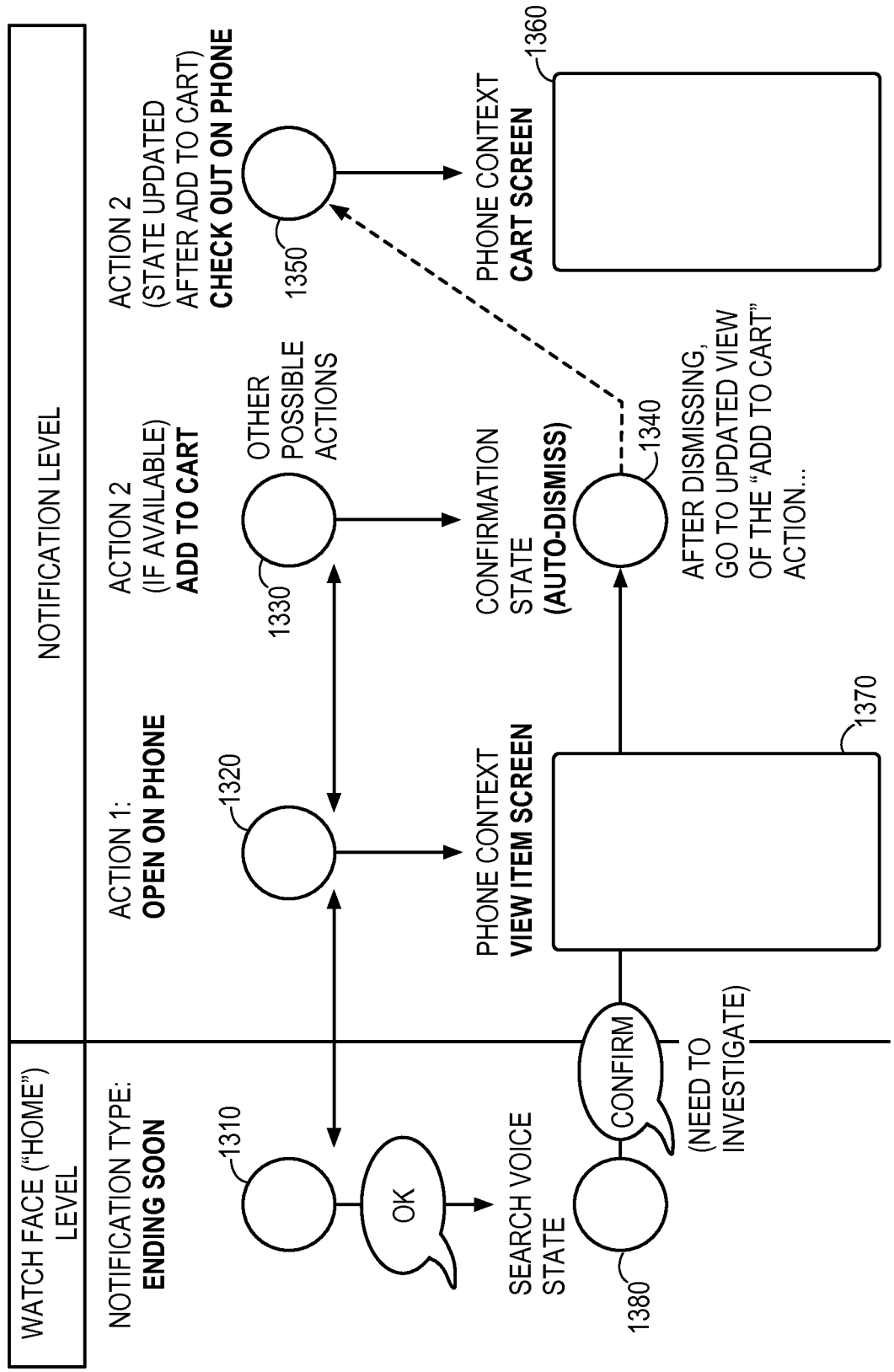
FIGS. 13A-13C illustrate different stages of applications for a wearable device, in accordance with some embodiments.
Figure 13B:
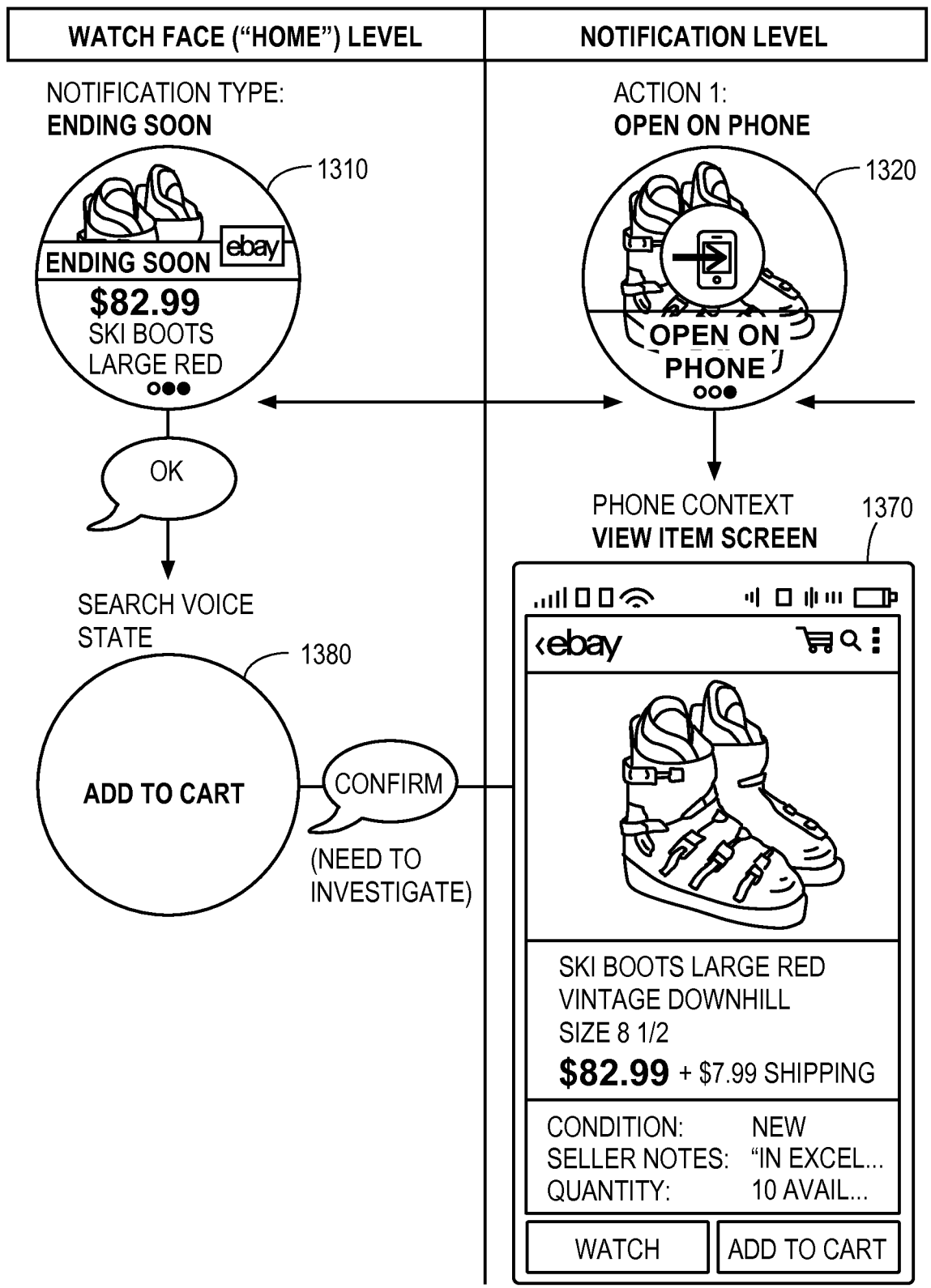
Figure 13C:
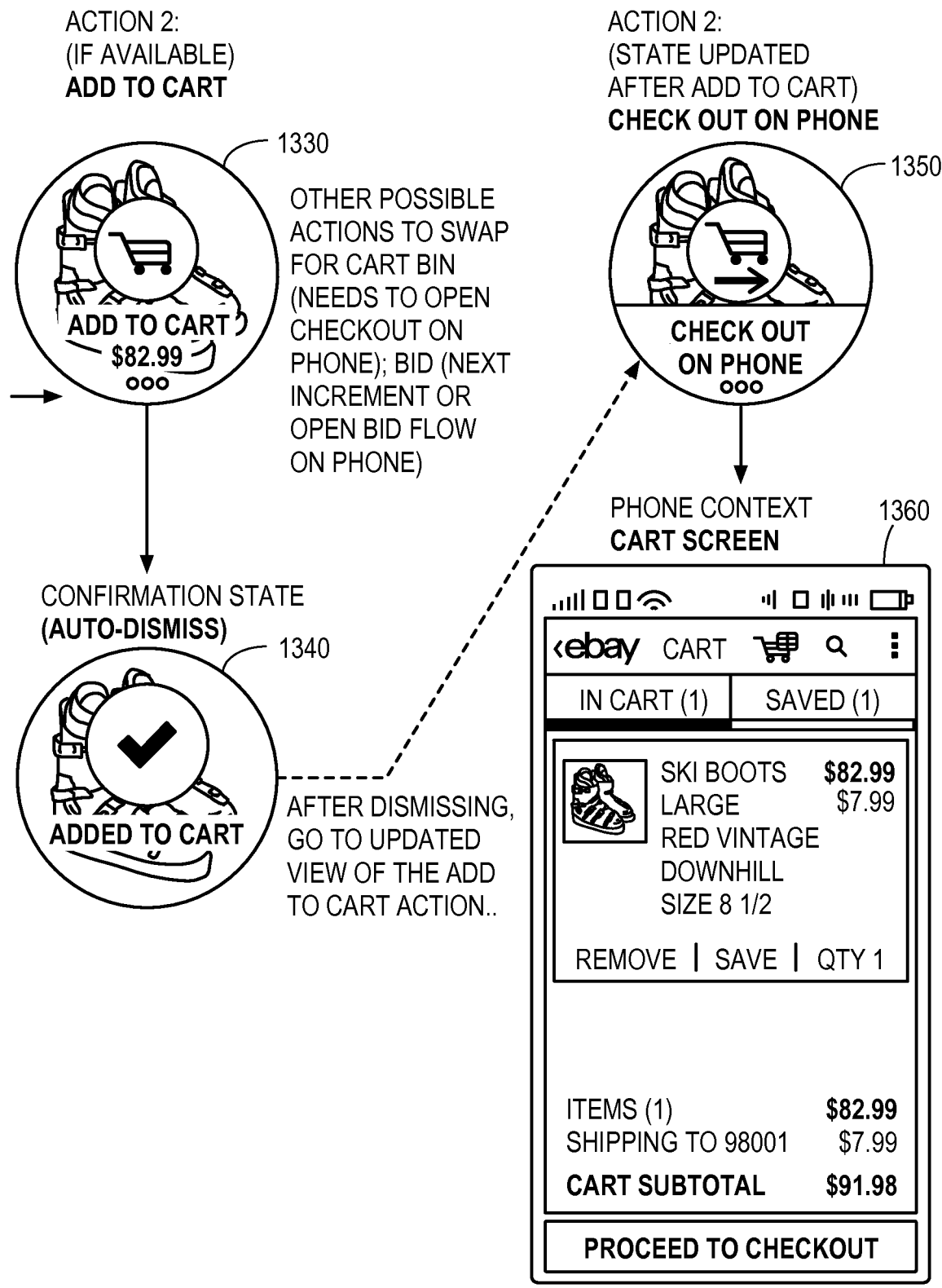

FIGS. 13A-13C illustrate different stages of applications for a wearable device, in accordance with some embodiments. FIG. 13A illustrates a comprehensive view of the different stages 1310-1380, while FIGS. 13B-13C illustrate close-up views of the different stages 1310-1380. As seen in FIGS. 13A-13C, throughout the stages, the user interface of the wearable device, which can be displayed on the face of the wearable device (e.g., on the face of a smartwatch), can transition between a home level, which can display home screen content an operating system of the wearable device, and a notification level, which can display additional details related to a notification being provided on the wearable device.

At stage 1310, the user interface displays a notification at the home level that an offering for sale (e.g., an auction) of an item on an online marketplace is ending soon. The system may determine to notify the user of this event based on the user's previous interaction(s) with the item, or similar items, on the online marketplace, such as the user "watching" the item, previously placing a bid on the item, viewing the item, or searching for the item. Other types of user interactions or indications of user interest in the item can also be used to determine whether to notify the user of an upcoming termination of an item.

The user can provide user input to trigger additional information regarding the notification to be presented on the wearable device or on another device, such as by touching the screen in a predefined location, by pressing a button on the wearable device, or by providing voice commands or other audio input. For example, the user can provide user input to trigger the display of an option for displaying more information about the item ending soon on another device, as seen at stage 1320. In response to user input requesting the presentation of additional information about the item on another device, the system can cause the presentation of the additional information about the item on the other device (e.g., on the user's smartphone), as seen at stage 1370. The additional information can include, but is not limited to, a shipping cost, the condition of the item, notes from the seller of the item, and information about the availability of the item (e.g., a quantity of the item still available for purchase). Other types of information are also within the scope of the present disclosure.

The user can provide additional user input to trigger the display of an option for adding the item to a shopping cart for the user, as seen at stage 1330. In response to the user providing input to cause the addition of the item to the user's shopping cart, the system can cause the display of a confirmation of the addition of the item to the shopping cart, as seen at stage 1340. The system can process the addition of the item to the user's shopping cart, such as by updating the user's account on the online marketplace accordingly. Then, in response to some user input to dismiss the notification, the system can display an option for the user to "check out" (e.g., complete the purchase of the items in the shopping cart) via another device, such as the user's smartphone, at stage 1350. In response to receiving user input to check out via another device, the system can cause the presentation of a purchase completion process on the other device, such as the display of the user's shopping cart on the user's smartphone, as seen at stage 1360.

Referring back to stage 1310, the user can provide audio input in response to the initial notification of the item ending soon. The audio input can comprise a voice command to add the item to the user's shopping cart, as seen at stage 1380. In response to audio input from the user requesting the addition of the item to the user's shopping cart, the system can process the request as previously discussed and provide a confirmation at stage 1340, as previously discussed.

As previously discussed, user input can be used to transition from one stage to another. It is contemplated that the user input can comprise a variety of different types of user inputs, including, but not limited to, tactile inputs (e.g., touching, pressing, swiping, touching and holding, tapping) and audio input (e.g., voice commands). Other types of user input are also within the scope of the present disclosure.

The wearable device application can be used to assist users in their everyday life. For example, the wearable device application can leverage the context of a user's situation to determine and customize what information to present to the user on the user's wearable device. The context can include factors including, but not limited to, the user's location (e.g., in a shopping mall, at home), and what activity the user is currently participating in (e.g., the user is driving, the user is exercising, the user is sleeping). The wearable device application can provide certain notifications under one set of circumstances for the user, but not under another set of circumstances for the user. For example, the system can be configured to only provide notifications on the user's wearable device that are related to urgent matters (e.g., the user has been outbid on an item for which the auction is ending in 10 minutes) when the user is determined to be driving.

The wearable device application can also be used to enable the user to quickly purchase an item using a simplified process. For example, the user can configure the wearable device application to complete the purchase of an item or items using a payment account (e.g., a PayPal® account) of the user. In this respect, the user can purchase items using a payment account via the user's wearable device.

Figure 14A:
FIGS. 14A-14B illustrate different stages of an application for a wearable device, in accordance with some embodiments.
Figure 14B:
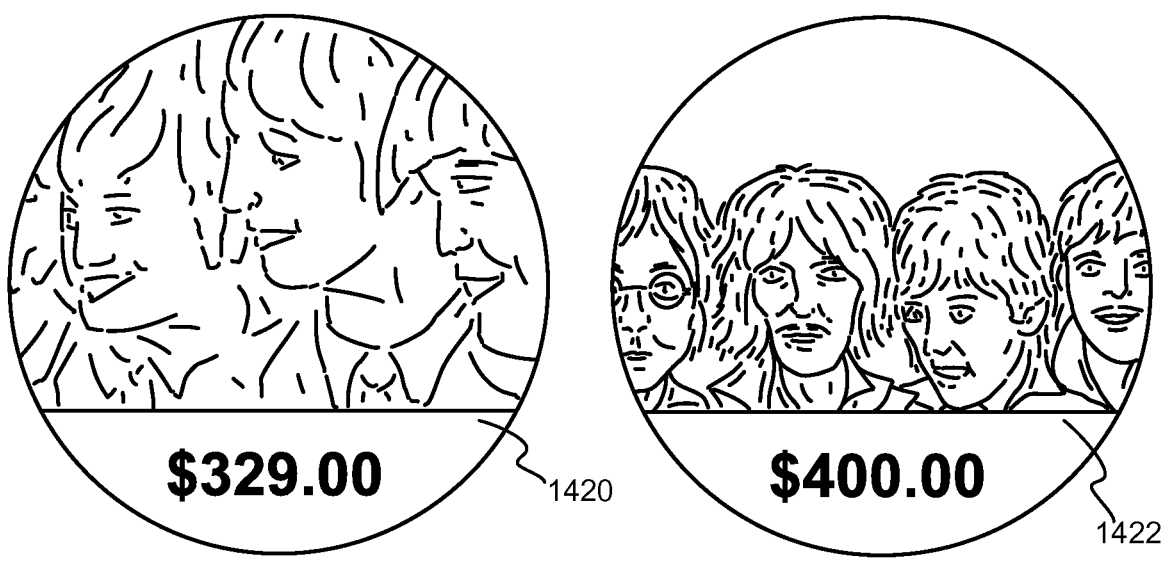

FIGS. 14A-14B illustrate different stages of an application for a wearable device, in accordance with some embodiments. In FIG. 14A, the user interface of the wearable device can display an identification 1410 of a specific collection. The user can select a graphical user interface element on the user interface of the wearable device to view the items in the specific collection. For example, in FIG. 14B, content (e.g., identification, graphics, price) of specific items in the specific collection can be displayed on the wearable device. The user can browse through the items in the collections, from one item 1420 to another item 1422.

Figure 15A:
FIGS. 15A-15B illustrate customized home screens for a wearable device, in accordance with some embodiments.
Figure 15B:
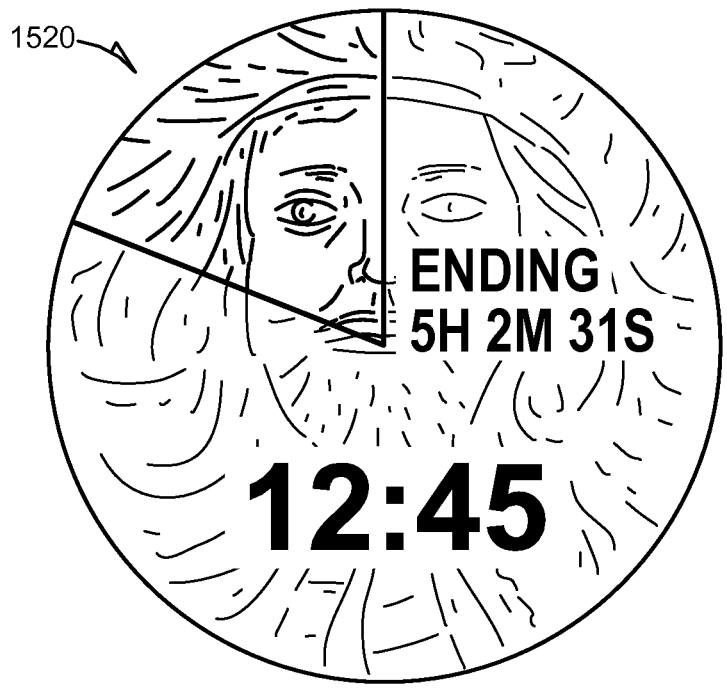

FIGS. 15A-15B illustrate customized home screens for a wearable device, in accordance with some embodiments. The wearable device module(s) 212 can provide functionality with respect to style. For example, as shown in FIG. 15A, the wearable device module(s) 212 can enable the user to customize the face display of the wearable device, such as the watchface of a smartwatch. The wearable device module(s) 212 can display content associated with items for sale on an online marketplace on the face of the wearable device as part of the standard display. In an example involving a smartwatch, the home level of the smartwatch can display content associated with an item, along with the standard information displayed by a watch (e.g., the time of day). In some embodiments, the content can include an image of an item and the time remaining for an auction of an item. In some embodiments, the system can enable the user to configure the face display. For example, the user can select what content or what type of content to display on the face display. In some embodiments, the system can determine whether or not to display the content based on context factors of the user. For example, it may not be desirable to display item related content during certain situations (e.g., on a job interview, on a date) or during certain times of the day (e.g., during work hours). The system can be configured to automatically adjust the face of the wearable device based on these factors and consideration.

In some embodiments, as shown in FIG. 15B, the wearable device module(s) 212 can be configured to cause a remaining time notification to be displayed on a home screen of an operating system on the wearable device. The remaining time notification can be configured to indicate an amount of time remaining for an item being offered for sale on the online marketplace (e.g., how much time left before an auction ends for an item). In some embodiments, as the amount of time remaining decreases, a visual indication of the decreasing amount of time can be displayed (e.g., the face of the watch can be gradually covered with more and more of a visual effect).

Figure 16:
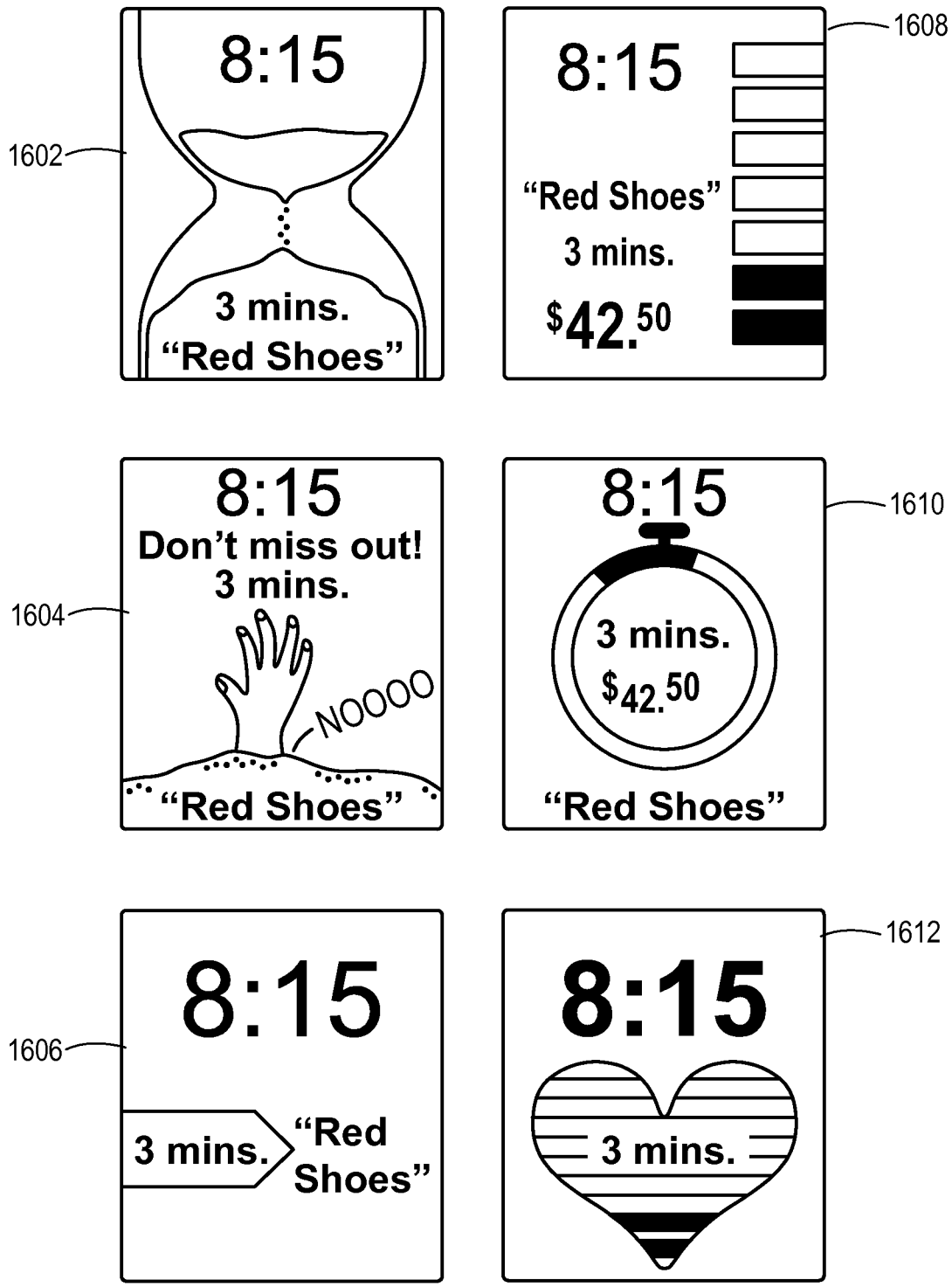
FIG. 16 illustrates different remaining time notifications displayed on a wearable device, in accordance with some embodiments.

FIG. 16 illustrates different remaining time notifications 1602-1612 that can be displayed on a wearable device, in accordance with some embodiments. Each one of the remaining time notifications 1602-1612 can indicate an amount of time remaining for an item (e.g., "Red Shoes" in the examples of FIG. 16) being offered for sale on an online marketplace. This remaining time can correspond to the amount of time remaining in which the user can perform one or more particular actions for the item. For example, the remaining time can correspond to the amount of time left in an auction of an item that the user is watching or that the user has been outbid on. This notification can inform the user in a timely manner, as well as in a way that stresses the urgency of any action the user might want to take.

Notification 1602 comprises a display of an hourglass reflecting the remaining time (e.g., 3 minutes) in which the user can take an action for the item (e.g., place a bid on the "Red Shoes"). The notification 1602 can comprise an animation of the sand in the hourglass running out from the top section of the hourglass to the bottom section of the hourglass as the remaining time approaches zero.

Notification 1604 comprises a display of a person sinking in quicksand. The notification 1604 can comprise an animation of the person's hand sinking more and more into the quicksand as the remaining time approaches zero.

Notification 1606 comprises a display of the remaining time (e.g., 3 minutes) in which the user can take an action for the item (e.g., place a bid on the "Red Shoes").

Notification 1608 comprises a display of a plurality of status bars in a vertical arrangement to reflecting the remaining time (e.g., 3 minutes) in which the user can take an action for the item (e.g., place a bid on the "Red Shoes"). The notification 1608 can comprise an animation of fewer and fewer of the status bars being highlighted or filled as the remaining time approaches zero.

Notification 1610 comprises a display of an alarm clock reflecting the remaining time (e.g., 3 minutes) in which the user can take an action for the item (e.g., place a bid on the "Red Shoes"). The notification 1612 can comprise an animation of less and less of the perimeter or border of the alarm clock being highlighted or filled as the remaining time approaches zero.

Notification 1612 comprises a display of a plurality of status bars in a vertical arrangement to reflecting the remaining time (e.g., 3 minutes) in which the user can take an action for the item. The notification 1612 can comprise an animation of fewer and fewer of the status bars being highlighted or filled as the remaining time approaches zero, similar to the notification 1608. Here, notification 1612 can provide a themed display, such as the status bars displayed as part of a heart. This themed display can be displayed based on a determination of a predetermined condition being met, such as a determination that it is Valentine's Day. Other configurations of remaining time notifications are also within the scope of the present disclosure.

Figure 17:
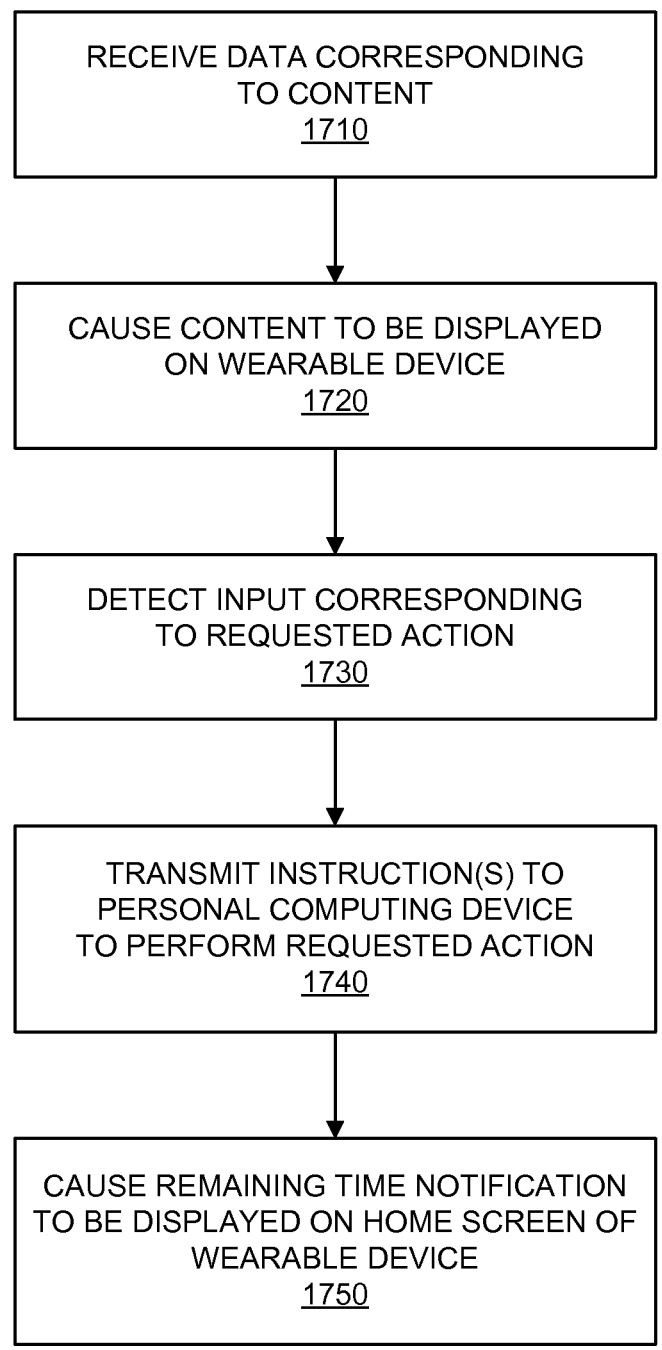
FIG. 17 is a flowchart illustrating a method for implementing an application for a wearable device, in accordance with some embodiments.

FIG. 17 is a flowchart illustrating a method 1700 for implementing an application for a wearable device, in accordance with some embodiments. The method 1700 can be performed by processing logic that can comprise hardware (e.g., circuitry, dedicated logic, programmable logic, microcode, etc.), software (e.g., instructions run on a processing device), or a combination thereof. In one implementation, the method 1700 is performed by the wearable device module(s) 212, which can be incorporated into any combination of one or more of the wearable device 410, the personal computing device 420, and the marketplace server 430, as previously discussed.

At operation 1710, a wearable device can receive data from a personal computing device. The data can correspond to content of an online marketplace. In some embodiments, the wearable device comprises a smartwatch. In some embodiments, the personal computing device comprises a smartphone.

At operation 1720, in response to receiving the data, the content can be caused to be displayed on the wearable device. In some embodiments, causing the content to be displayed on the wearable device comprises causing a notification to be displayed on the wearable device. For example, the notification can be configured to notify the user of an item being offered for sale on the online marketplace. In another example, the notification can be configured to notify the user that the user has been outbid on an item being offered for sale on the online marketplace.

At operation 1730, the wearable device can then receive an input from the user. The input can correspond to a requested action.

At operation 1740, the wearable device can then send at least one instruction to the personal computing device. The instruction(s) can be configured to cause the personal computing device to perform the requested action. For example, the instruction(s) can be configured to cause the personal computing device to display an item listing page for an item being offered for sale on the online marketplace. In another example, the instruction(s) can be configured to cause the personal computing device to instruct the online marketplace to place a bid, on behalf of the user, for an item being offered for sale on the online marketplace. In a further example, the instruction(s) can be configured to cause the personal computing device to instruct the online marketplace to increase a bid, on behalf of the user, for an item being offered for sale on the online marketplace.

At operation 1750, a remaining time notification can be caused to be displayed on a home screen of an operating system on the wearable device. The remaining time notification can be configured to indicate an amount of time remaining for an item being offered for sale on the online marketplace.

As previously discussed, any of the data or instructions discussed above can be transmitted between the marketplace server and the wearable device directly without the use of the personal computing device. For example, the data corresponding to the content can be transmitted from the marketplace server to the wearable device without the data being transmitted to the personal computing device. Additionally, the instruction(s) to perform the requested action(s) can be transmitted from the wearable device to the marketplace server without the instruction(s) being transmitted to the personal computing device.

It is contemplated that any of the other features described within the present disclosure can be incorporated into the method 1700.

Figure 18:
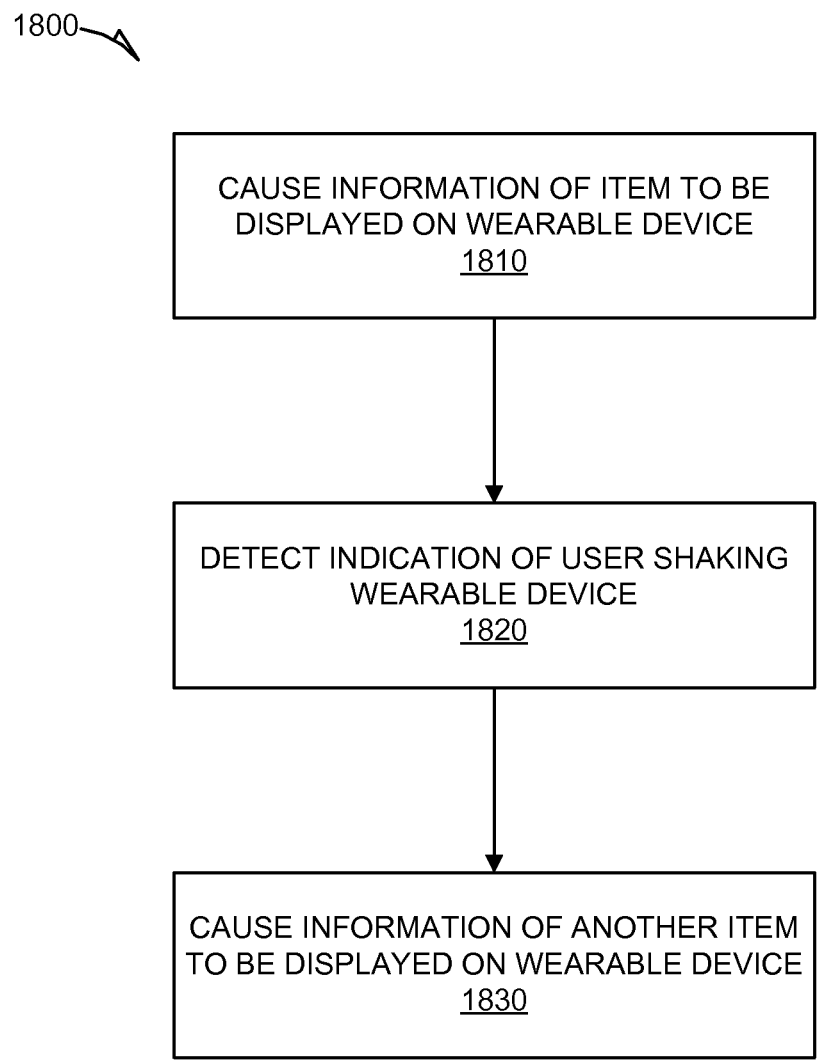
FIG. 18 is a flowchart illustrating a method for implementing an application for a wearable device, in accordance with some embodiments.

FIG. 18 is a flowchart illustrating a method 1800 for implementing an application for a wearable device, in accordance with some embodiments. The method 1800 can be performed by processing logic that can comprise hardware (e.g., circuitry, dedicated logic, programmable logic, microcode, etc.), software (e.g., instructions run on a processing device), or a combination thereof. In one implementation, the method 1800 is performed by the wearable device module(s) 212, which can be incorporated into any combination of one or more of the wearable device 410, the personal computing device 420, and the marketplace server 430, as previously discussed.

At operation 1810, information of a first item being offered for sale on an online marketplace can be caused to be displayed on the wearable device.

At operation 1820, an indication of the user shaking the wearable device can be received.

At operation 1830, in response to receiving the indication of the user shaking the wearable device, information of a second item being offered for sale on the online marketplace can be caused to be displayed on the wearable device.

It is contemplated that any of the other features described within the present disclosure can be incorporated into the method 1800.

In some embodiments, the wearable device module(s) 212 can be used to gather context information about the user. For example, the wearable device module(s) 212 can determine how much exercise a user is getting (e.g., how many steps the user has taken or how many miles the user has walked/ran within a certain period of time) or how much sleep the user is getting, as well as the timing for these activities (e.g., what time of day and for how long). Such information can be determined using one or more sensors on the wearable device, including, but not limited to, pedometers, gyroscopes, altimeters, microphones, and image capture devices. This context information can then be used to determine a user's patterns and when the best time would be to provide certain notifications to the user on the wearable device.

It is contemplated that any features of any embodiments disclosed herein can be combined with any other features of any other embodiments disclosed herein. Accordingly, these any such hybrid embodiments are within the scope of the present disclosure.

Example Personal Computing Device

Figure 19:
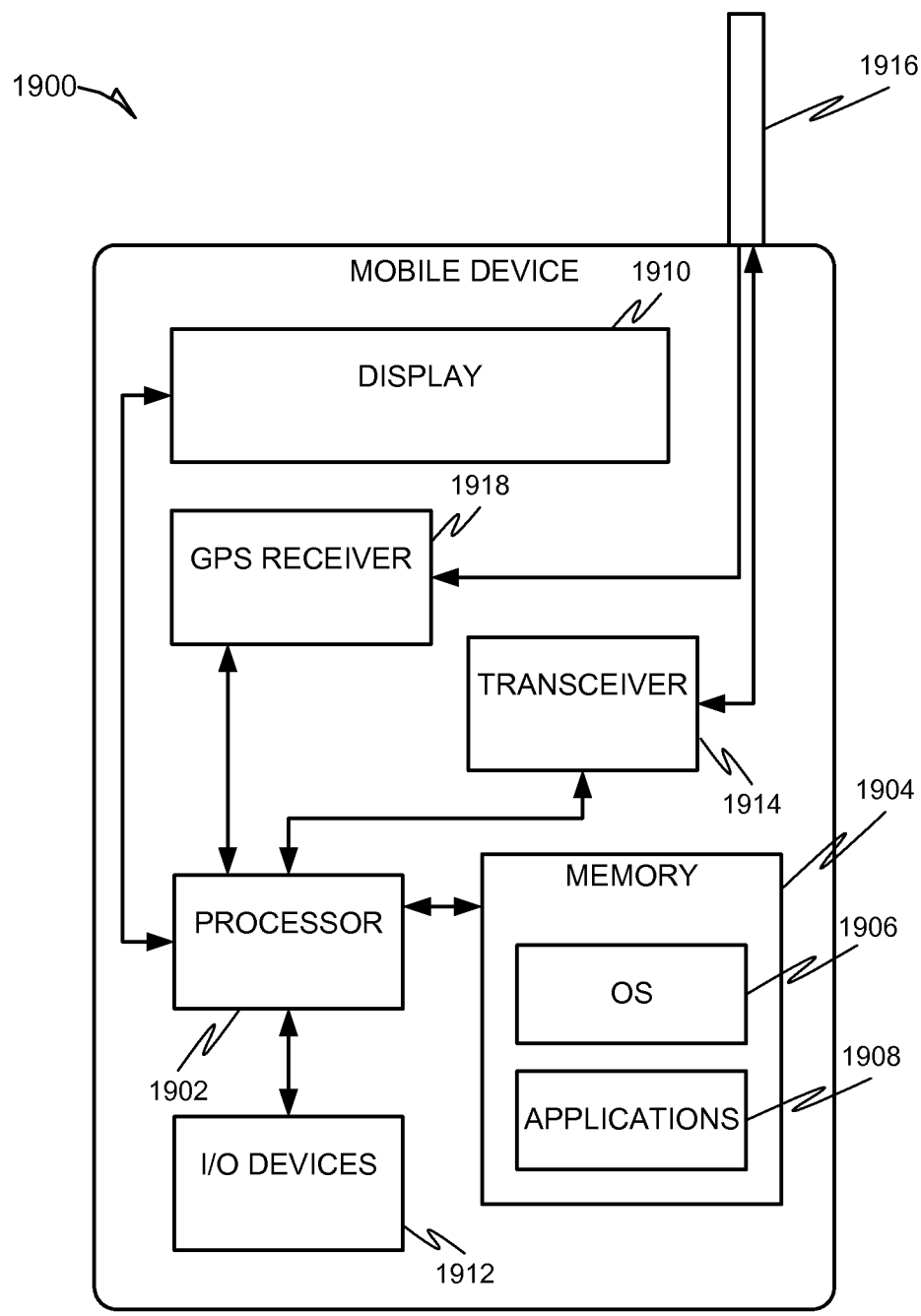
FIG. 19 is a block diagram illustrating a personal computing device, in accordance with some example embodiments.

FIG. 19 is a block diagram illustrating a personal computing device 1900, according to an example embodiment. The mobile device 1900 can include a processor 1902. The processor 1902 can be any of a variety of different types of commercially available processors suitable for mobile devices 1900 (e.g., an XScale architecture microprocessor, a Microprocessor without Interlocked Pipeline Stages (MIPS) architecture processor, or another type of processor). A memory 1904, such as a random access memory (RAM), a Flash memory, or other type of memory, is typically accessible to the processor 1902. The memory 1904 can be adapted to store an operating system (OS) 1906, as well as application programs 1908, such as a mobile location enabled application that can provide LBSs to a user. The processor 1902 can be coupled, either directly or via appropriate intermediary hardware, to a display 1910 and to one or more input/output (I/O) devices 1912, such as a keypad, a touch panel sensor, a microphone, and the like. Similarly, in some embodiments, the processor 1902 can be coupled to a transceiver 1914 that interfaces with an antenna 1916. The transceiver 1914 can be configured to both transmit and receive cellular network signals, wireless data signals, or other types of signals via the antenna 1916, depending on the nature of the mobile device 1900. Further, in some configurations, a GPS receiver 1918 can also make use of the antenna 1916 to receive GPS signals.

Modules, Components and Logic

Certain embodiments are described herein as including logic or a number of components, modules, or mechanisms. Modules can constitute either software modules (e.g., code embodied on a machine-readable medium or in a transmission signal) or hardware modules. A hardware module is a tangible unit capable of performing certain operations and can be configured or arranged in a certain manner. In example embodiments, one or more computer systems (e.g., a standalone, client, or server computer system) or one or more hardware modules of a computer system (e.g., a processor or a group of processors) can be configured by software (e.g., an application or application portion) as a hardware module that operates to perform certain operations as described herein.

In various embodiments, a hardware module can be implemented mechanically or electronically. For example, a hardware module can comprise dedicated circuitry or logic that is permanently configured (e.g., as a special-purpose processor, such as a field programmable gate array (FPGA) or an application-specific integrated circuit (ASIC)) to perform certain operations. A hardware module can also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) can be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor can be configured as respective different hardware modules at different times. Software can accordingly configure a processor, for example, to constitute a particular hardware module at one instance of time and to constitute a different hardware module at a different instance of time.

Hardware modules can provide information to, and receive information from, other hardware modules. Accordingly, the described hardware modules can be regarded as being communicatively coupled. Where multiple of such hardware modules exist contemporaneously, communications can be achieved through signal transmission (e.g., over appropriate circuits and buses) that connect the hardware modules. In embodiments in which multiple hardware modules are configured or instantiated at different times, communications between such hardware modules can be achieved, for example, through the storage and retrieval of information in memory structures to which the multiple hardware modules have access. For example, one hardware module can perform an operation and store the output of that operation in a memory device to which it is communicatively coupled. A further hardware module can then, at a later time, access the memory device to retrieve and process the stored output. Hardware modules can also initiate communications with input or output devices and can operate on a resource (e.g., a collection of information).

The various operations of example methods described herein can be performed, at least partially, by one or more processors that are temporarily configured (e.g., by software) or permanently configured to perform the relevant operations. Whether temporarily or permanently configured, such processors can constitute processor-implemented modules that operate to perform one or more operations or functions. The modules referred to herein can, in some example embodiments, comprise processor-implemented modules.

Similarly, the methods described herein can be at least partially processor-implemented. For example, at least some of the operations of a method can be performed by one or more processors or processor-implemented modules. The performance of certain of the operations can be distributed among the one or more processors, not only residing within a single machine, but deployed across a number of machines. In some example embodiments, the processor or processors can be located in a single location (e.g., within a home environment, an office environment or as a server farm), while in other embodiments the processors can be distributed across a number of locations.

The one or more processors can also operate to support performance of the relevant operations in a "cloud computing" environment or as a "software as a service" (SaaS). For example, at least some of the operations can be performed by a group of computers (as examples of machines including processors), these operations being accessible via a network (e.g., the network 104 of FIG. 1) and via one or more appropriate interfaces (e.g., APIs).

Electronic Apparatus and System

Example embodiments can be implemented in digital electronic circuitry, or in computer hardware, firmware, software, or in combinations of them. Example embodiments can be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations can be performed by one or more programmable processors executing a computer program to perform functions by operating on input data and generating output. Method operations can also be performed by, and apparatus of example embodiments can be implemented as, special purpose logic circuitry (e.g., a FPGA or an ASIC).

A computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware can be a design choice. Below are set out hardware (e.g., machine) and software architectures that can be deployed, in various example embodiments.

Example Machine Architecture and Machine-Readable Medium

Figure 20:
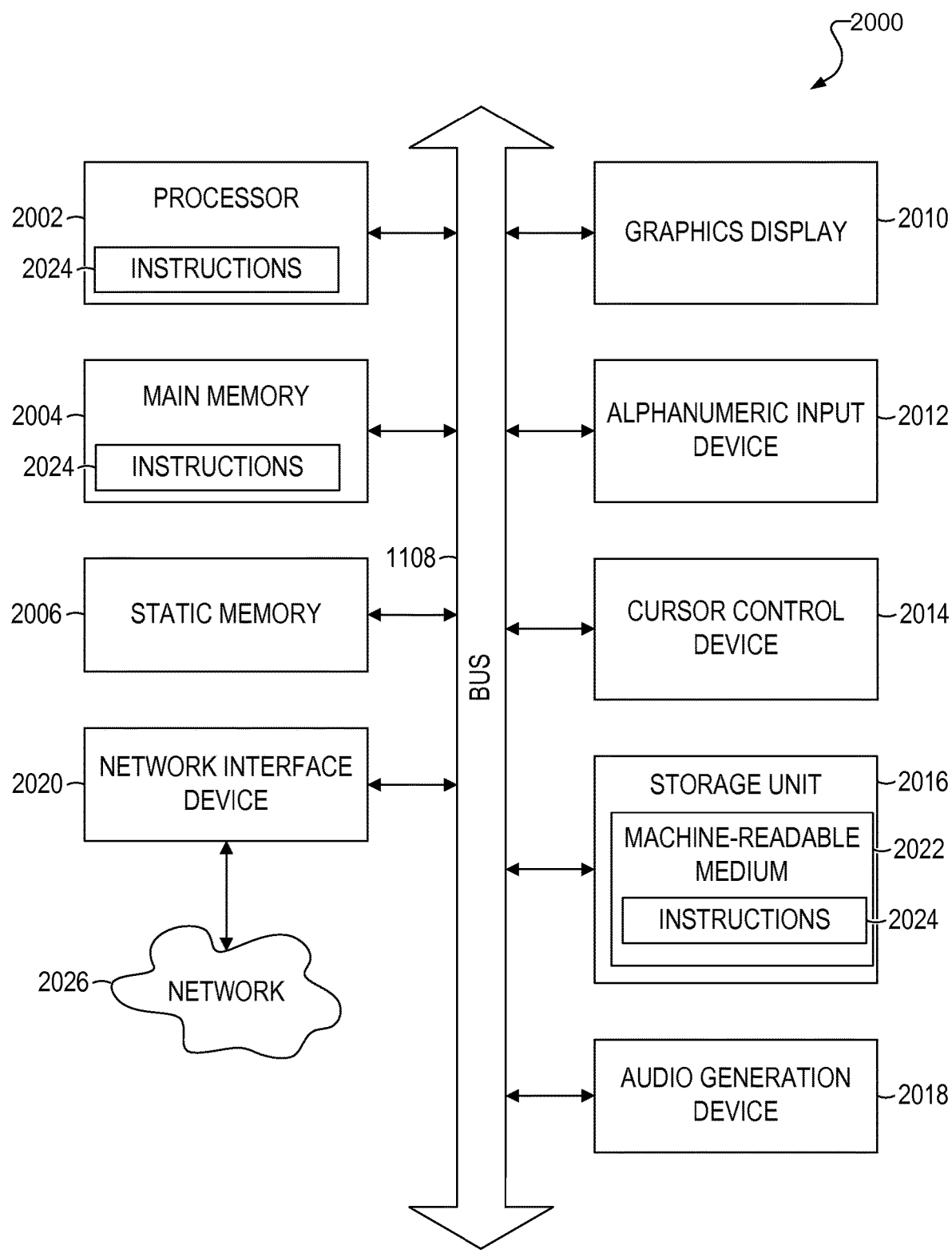
FIG. 20 shows a diagrammatic representation of a machine in the example form of a computer system within which a set of instructions can be executed to cause the machine to perform any one or more of the methodologies discussed herein, in accordance with some embodiments.

FIG. 20 is a block diagram of a machine in the example form of a computer system 2000 within which instructions for causing the machine to perform any one or more of the methodologies discussed herein can be executed. In alternative embodiments, the machine operates as a standalone device or can be connected (e.g., networked) to other machines. In a networked deployment, the machine can operate in the capacity of a server or a client machine in a server-client network environment, or as a peer machine in a peer-to-peer (or distributed) network environment. The machine can be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 2000 includes a processor 2002 (e.g., a central processing unit (CPU), a graphics processing unit (GPU) or both), a main memory 2004 and a static memory 2006, which communicate with each other via a bus 2008. The computer system 2000 can further include a video display unit 2010 (e.g., a liquid crystal display (LCD) or a cathode ray tube (CRT)). The computer system 2000 also includes an alphanumeric input device 2012 (e.g., a keyboard), a user interface (UI) navigation (or cursor control) device 2014 (e.g., a mouse), a drive unit 2016, a signal generation device 2018 (e.g., a speaker), and a network interface device 2020.

Machine-Readable Medium

The drive unit 2016 includes a machine-readable medium 2022 on which is stored one or more sets of data structures and instructions 2024 (e.g., software) embodying or utilized by any one or more of the methodologies or functions described herein. The instructions 2024 can also reside, completely or at least partially, within the main memory 2004 and/or within the processor 2002 during execution thereof by the computer system 2000, the main memory 2004 and the processor 2002 also constituting machine-readable media. The instructions 2024 can also reside, completely or at least partially, within the static memory 2006.

While the machine-readable medium 2022 is shown in an example embodiment to be a single medium, the term "machine-readable medium" can include a single medium or multiple media (e.g., a centralized or distributed database, and/or associated caches and servers) that store the one or more instructions 2024 or data structures. The term "machine-readable medium" shall also be taken to include any tangible medium that is capable of storing, encoding or carrying instructions for execution by the machine and that cause the machine to perform any one or more of the methodologies of the present embodiments, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices (e.g., Erasable Programmable Read-Only Memory (EPROM), Electrically Erasable Programmable Read-Only Memory (EEPROM), and flash memory devices); magnetic disks such as internal hard disks and removable disks; magneto-optical disks; and compact disc-read-only memory (CD-ROM) and digital versatile disc (or digital video disc) read-only memory (DVD-ROM) disks.

Furthermore, the machine-readable medium is non-transitory in that it does not embody a propagating signal. However, labeling the tangible machine-readable medium as "non-transitory" should not be construed to mean that the medium is incapable of movement—the medium should be considered as being transportable from one physical location to another. Additionally, since the machine-readable medium is tangible, the medium may be considered to be a machine-readable device.

Transmission Medium

The instructions 2024 can further be transmitted or received over a communications network 2026 using a transmission medium. The instructions 2024 can be transmitted using the network interface device 2020 and any one of a number of well-known transfer protocols (e.g., HTTP). Examples of communication networks include a LAN, a WAN, the Internet, mobile telephone networks, POTS networks, and wireless data networks (e.g., WiFi and WiMax networks). The term "transmission medium" shall be taken to include any intangible medium capable of storing, encoding, or carrying instructions for execution by the machine, and includes digital or analog communications signals or other intangible media to facilitate communication of such software.

Although an embodiment has been described with reference to specific example embodiments, it will be evident that various modifications and changes can be made to these embodiments without departing from the broader scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter can be practiced. The embodiments illustrated are described in sufficient detail to enable those skilled in the art to practice the teachings disclosed herein. Other embodiments can be utilized and derived therefrom, such that structural and logical substitutions and changes can be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter can be referred to herein, individually or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose can be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A computer-implemented method comprising:
   receiving, from a personal computing device, specification of a wearable device input that causes an online action to be performed by the personal computing device in response to the wearable device input being detected, the wearable device input specified using setting options displayed on the personal computing device that is connected to the wearable device;
   receiving, by the wearable device, data from the personal computing device that is communicatively coupled to the wearable device, the data describing events of different types of content published online;
   in response to the receiving the data, displaying, on a display device of the wearable device, a plurality of notifications describing the events of the different types of content published online;
   receiving, by the wearable device, selection of one of the plurality of notifications;
   detecting, by the wearable device, the wearable device input from a user while the selected notification from the plurality of notifications is displayed on the display device of the wearable device; and
   transmitting, by a processor of the wearable device, at least one instruction to the personal computing device, the at least one instruction configured to cause the personal computing device to perform the online action in response to detection of the specified wearable device input, the at least one instruction is configured to cause the personal computing device to display, on the personal computing device, an item listing corresponding to the notification selected through the wearable device.

2. The method of claim 1, wherein the online action is an incremental network action having a increment value specified in the setting options of the personal computing device.

3. The method of claim 2, wherein the wearable device input is a gesture and the incremental network action is a bid on an item listing published online and the increment value specified in the setting options is a bid increment.

4. The method of claim 1, wherein the wearable device displays the plurality of notifications as vertically stacked scrollable user interface elements.

5. The method of claim 1, wherein the wearable device is a smartwatch and the personal computing device is a smartphone.

6. The method of claim 1, wherein the at least one instruction is configured to cause the personal computing device to instruct a server to place a bid on an item in an item listing published online, the item listing corresponding to the notification selected on the wearable device.

7. The method of claim 1, wherein the at least one instruction is configured to cause the personal computing device to instruct a server to increase an existing bid for an item of an item listing published online, the item listing corresponding to the notification selected on the wearable device.

8. The method of claim 1, further comprising:
   in response to receiving the selection of one of the plurality of notifications, displaying, on the wearable device, only the selected notification with additional details that describe an event corresponding to the selected notification.

9. The method of claim 1, further comprising:
displaying the selected notification with a user interface element configured to generate the instruction in response to receiving a user gesture on the wearable device.

10. A wearable device comprising:
one or more processors;
a memory including instructions which when performed by the one or more processors, cause the one or more processors to perform operations comprising:
receiving, from a personal computing device, specification of a wearable device input that causes an online action to be performed by the personal computing device in response to the wearable device input being detected, the wearable device input specified using setting options displayed on the personal computing device that is connected to the wearable device;
receiving, from the personal computing device, data describing events of different types of content published online;
in response to receiving the data, displaying, on a display device of the wearable device, a plurality of notifications describing the events of the different types of content published online;
receiving, by the wearable device, selection of one of the plurality of notifications;
detecting, by the wearable device, the wearable device input from the user while the selected notification from the plurality of notifications is displayed on the display device of the wearable device; and
transmitting at least one instruction to the personal computing device of the user, the at least one instruction configured to cause the personal computing device to perform the online action, the at least one instruction is configured to cause the personal computing device to display, on the personal computing device, an item listing corresponding to the notification selected through the wearable device.

11. The wearable device of claim 10, wherein the online action is an incremental network action having a increment value specified in the setting options of the personal computing device.

12. The wearable device of claim 10, wherein the wearable device displays the plurality of notifications as vertically stacked scrollable user interface elements.

13. The wearable device of claim 10, wherein each of the plurality of notifications corresponds to an item listing published online.

14. The wearable device of claim 10, wherein the at least one instruction is configured to cause the personal computing device to instruct a server to place a bid on an item listing published online, the item listing corresponding to the notification selected on the wearable device.

15. The wearable device of claim 10, wherein the at least one instruction is configured to cause the personal computing device to instruct a server to increase an existing bid for an item listing published online, the item listing corresponding to the notification selected on the wearable device.

16. The wearable device of claim 10, further comprising:
in response to receiving the selection of one of the plurality of notifications, displaying, on the wearable device, only the selected notification with additional details that describe an event corresponding to the selected notification.

17. The wearable device of claim 10, further comprising:
displaying the selected notification with a user interface element configured to generate the instruction in response to receiving a user gesture on the wearable device.

18. A machine-readable storage device storing a set of instructions that, when executed by at least one processor, causes the at least one processor to perform operations comprising:
receiving, from a personal computing device of a user, specification of a wearable device input that causes an online action to be performed by the personal computing device in response to the wearable device input being detected, the wearable device input specified using setting options displayed on the personal computing device that is connected to the wearable device;
receiving, from the personal computing device, data describing events of different types of content published online;
in response to the receiving the data, displaying, on a display device of the wearable device, a plurality of notifications describing the events of the different types of content published online;
detecting, by the wearable device, the wearable device input from the user while the selected notification from the plurality of notifications is displayed on the display device of the wearable device; and
transmitting, by the wearable device, at least one instruction to the personal computing device, the at least one instruction configured to cause the personal computing device to perform the online action, the at least one instruction is configured to cause the personal computing device to display, on the personal computing device, an item listing corresponding to the notification selected through the wearable device.

* * * * *